(12) United States Patent
Asano et al.

(10) Patent No.: US 10,063,157 B2
(45) Date of Patent: Aug. 28, 2018

(54) POWER SOURCE DEVICE AND IMAGE FORMING APPARATUS

(71) Applicant: CANON KABUSHIKI KAISHA, Tokyo (JP)

(72) Inventors: Hiroki Asano, Kawasaki (JP); Yasuhiro Shimura, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/380,129

(22) Filed: Dec. 15, 2016

(65) Prior Publication Data

US 2017/0176919 A1     Jun. 22, 2017

(30) Foreign Application Priority Data

Dec. 28, 2015 (JP) ................................. 2015-247608

(51) Int. Cl.
   *H02M 3/335*  (2006.01)
(52) U.S. Cl.
   CPC ... *H02M 3/33553* (2013.01); *H02M 3/33507* (2013.01)
(58) Field of Classification Search
   CPC .... H02M 3/335; H02M 3/338; H02M 3/3381; H02M 3/3385; H02M 3/33569; H02M 3/33507; H02M 3/33538; H02M 3/33546; H02M 3/33515; H02M 3/33576; H02M 3/33553; H02M 3/33523; H02M 3/337; H02M 3/3384

USPC ............ 363/16, 20, 22, 18, 19, 21.01–21.18
See application file for complete search history.

(56) References Cited

U.S. PATENT DOCUMENTS

| | | | |
|---|---|---|---|
| 6,061,252 A | 5/2000 | Hosotani | |
| 2011/0103101 A1* | 5/2011 | Hiasa | H02M 3/33507 363/21.12 |
| 2014/0376273 A1* | 12/2014 | Hosotani | H02M 1/32 363/21.02 |

FOREIGN PATENT DOCUMENTS

JP     H11187664 A     7/1999

\* cited by examiner

*Primary Examiner* — Nguyen Tran
(74) *Attorney, Agent, or Firm* — Rossi, Kimms & McDowell LLP

(57) ABSTRACT

A power source device includes a transformer including a primary winding and a secondary winding; a first switch portion connected with the primary winding in series; a circuit including a capacitor and a second switch portion connected in series and connected with the primary winding in parallel; a controller for controlling conduction between the first switch portion and the second switch portion, wherein the first switch portion and the second switch portion are alternately conducted to generate an output voltage at a secondary side of the transformer, a detecting portion for detecting a current flowing through the first switch portion. The controller controls conduction of the first switch portion and the second switch portion so that a value of the current detected by the detecting portion does not exceed a threshold depending on conduction times of the first switch portion and second switch portion.

19 Claims, 18 Drawing Sheets

Table A
(Iave < Iavecomp1)

Table B
(Iavecomp1 ≤ Iave < Iavecomp2)

Table C
(Iavecomp2 ≤ Iave)

| VFB (dec) | TIME1 ($\mu$s) | TIME2 ($\mu$s) | TIME1/ TIME2 | VFB (dec) | TIME1 ($\mu$s) | TIME2 ($\mu$s) | TIME1/ TIME2 | VFB (dec) | TIME1 ($\mu$s) | TIME2 ($\mu$s) | TIME1/ TIME2 |
|---|---|---|---|---|---|---|---|---|---|---|---|
| 1 | 2.03 | 4.00 | 0.5075 | 1 | 3.05 | 6.00 | 0.5075 | 1 | 4.06 | 8.00 | 0.5075 |
| 2 | 2.06 | 4.00 | 0.515 | 2 | 3.09 | 6.00 | 0.515 | 2 | 4.12 | 8.00 | 0.515 |
| 3 | 2.09 | 4.00 | 0.5225 | 3 | 3.14 | 6.00 | 0.5225 | 3 | 4.18 | 8.00 | 0.5225 |
| 4 | 2.12 | 4.00 | 0.53 | 4 | 3.18 | 6.00 | 0.53 | 4 | 4.24 | 8.00 | 0.53 |
| 5 | 2.15 | 4.00 | 0.5375 | 5 | 3.23 | 6.00 | 0.5375 | 5 | 4.30 | 8.00 | 0.5375 |
| 6 | 2.18 | 4.00 | 0.545 | 6 | 3.27 | 6.00 | 0.545 | 6 | 4.36 | 8.00 | 0.545 |
| 7 | 2.21 | 4.00 | 0.5525 | 7 | 3.32 | 6.00 | 0.5525 | 7 | 4.42 | 8.00 | 0.5525 |
| 8 | 2.24 | 4.00 | 0.56 | 8 | 3.36 | 6.00 | 0.56 | 8 | 4.48 | 8.00 | 0.56 |
| 9 | 2.27 | 4.00 | 0.5675 | 9 | 3.41 | 6.00 | 0.5675 | 9 | 4.54 | 8.00 | 0.5675 |
| 10 | 2.30 | 4.00 | 0.575 | 10 | 3.45 | 6.00 | 0.575 | 10 | 4.60 | 8.00 | 0.575 |
| 11 | 2.33 | 4.00 | 0.5825 | 11 | 3.50 | 6.00 | 0.5825 | 11 | 4.66 | 8.00 | 0.5825 |
| 12 | 2.36 | 4.00 | 0.59 | 12 | 3.54 | 6.00 | 0.59 | 12 | 4.72 | 8.00 | 0.59 |
| 13 | 2.39 | 4.00 | 0.5975 | 13 | 3.59 | 6.00 | 0.5975 | 13 | 4.78 | 8.00 | 0.5975 |
| 14 | 2.42 | 4.00 | 0.605 | 14 | 3.63 | 6.00 | 0.605 | 14 | 4.84 | 8.00 | 0.605 |
| 15 | 2.45 | 4.00 | 0.6125 | 15 | 3.68 | 6.00 | 0.6125 | 15 | 4.90 | 8.00 | 0.6125 |
| 16 | 2.48 | 4.00 | 0.62 | 16 | 3.72 | 6.00 | 0.62 | 16 | 4.96 | 8.00 | 0.62 |
| 17 | 2.51 | 4.00 | 0.6275 | 17 | 3.77 | 6.00 | 0.6275 | 17 | 5.02 | 8.00 | 0.6275 |
| 18 | 2.54 | 4.00 | 0.635 | 18 | 3.81 | 6.00 | 0.635 | 18 | 5.08 | 8.00 | 0.635 |
| 19 | 2.57 | 4.00 | 0.6425 | 19 | 3.86 | 6.00 | 0.6425 | 19 | 5.14 | 8.00 | 0.6425 |
| 20 | 2.60 | 4.00 | 0.65 | 20 | 3.90 | 6.00 | 0.65 | 20 | 5.20 | 8.00 | 0.65 |
| 21 | 2.63 | 4.00 | 0.6575 | 21 | 3.95 | 6.00 | 0.6575 | 21 | 5.26 | 8.00 | 0.6575 |
| 22 | 2.66 | 4.00 | 0.665 | 22 | 3.99 | 6.00 | 0.665 | 22 | 5.32 | 8.00 | 0.665 |
| 23 | 2.69 | 4.00 | 0.6725 | 23 | 4.04 | 6.00 | 0.6725 | 23 | 5.38 | 8.00 | 0.6725 |
| 24 | 2.72 | 4.00 | 0.68 | 24 | 4.08 | 6.00 | 0.68 | 24 | 5.44 | 8.00 | 0.68 |
| 25 | 2.75 | 4.00 | 0.6875 | 25 | 4.13 | 6.00 | 0.6875 | 25 | 5.50 | 8.00 | 0.6875 |
| 26 | 2.78 | 4.00 | 0.695 | 26 | 4.17 | 6.00 | 0.695 | 26 | 5.56 | 8.00 | 0.695 |
| 27 | 2.81 | 4.00 | 0.7025 | 27 | 4.22 | 6.00 | 0.7025 | 27 | 5.62 | 8.00 | 0.7025 |
| 28 | 2.84 | 4.00 | 0.71 | 28 | 4.26 | 6.00 | 0.71 | 28 | 5.68 | 8.00 | 0.71 |
| 29 | 2.87 | 4.00 | 0.7175 | 29 | 4.31 | 6.00 | 0.7175 | 29 | 5.74 | 8.00 | 0.7175 |
| 30 | 2.90 | 4.00 | 0.725 | 30 | 4.35 | 6.00 | 0.725 | 30 | 5.80 | 8.00 | 0.725 |

FIG.5A

| 31 | 2.93 | 4.00 | 0.7325 | 31 | 4.40 | 6.00 | 0.7325 | 31 | 5.86 | 8.00 | 0.7325 |
|----|------|------|--------|----|------|------|--------|----|------|------|--------|
| 32 | 2.96 | 4.00 | 0.74   | 32 | 4.44 | 6.00 | 0.74   | 32 | 5.92 | 8.00 | 0.74   |
| 33 | 2.99 | 4.00 | 0.7475 | 33 | 4.49 | 6.00 | 0.7475 | 33 | 5.98 | 8.00 | 0.7475 |
| 34 | 3.02 | 4.00 | 0.755  | 34 | 4.53 | 6.00 | 0.755  | 34 | 6.04 | 8.00 | 0.755  |
| 35 | 3.05 | 4.00 | 0.7625 | 35 | 4.58 | 6.00 | 0.7625 | 35 | 6.10 | 8.00 | 0.7625 |
| 36 | 3.08 | 4.00 | 0.77   | 36 | 4.62 | 6.00 | 0.77   | 36 | 6.16 | 8.00 | 0.77   |
| 37 | 3.11 | 4.00 | 0.7775 | 37 | 4.67 | 6.00 | 0.7775 | 37 | 6.22 | 8.00 | 0.7775 |
| 38 | 3.14 | 4.00 | 0.785  | 38 | 4.71 | 6.00 | 0.785  | 38 | 6.28 | 8.00 | 0.785  |
| 39 | 3.17 | 4.00 | 0.925  | 39 | 4.76 | 6.00 | 0.7925 | 39 | 6.34 | 8.00 | 0.925  |
| 40 | 3.20 | 4.00 | 0.8    | 40 | 4.80 | 6.00 | 0.8    | 40 | 6.40 | 8.00 | 0.8    |
| 41 | 3.23 | 4.00 | 0.8075 | 41 | 4.85 | 6.00 | 0.8075 | 41 | 6.46 | 8.00 | 0.8075 |
| 42 | 3.26 | 4.00 | 0.815  | 42 | 4.89 | 6.00 | 0.815  | 42 | 6.52 | 8.00 | 0.815  |
| 43 | 3.29 | 4.00 | 0.8225 | 43 | 4.94 | 6.00 | 0.8225 | 43 | 6.58 | 8.00 | 0.8225 |
| 44 | 3.32 | 4.00 | 0.83   | 44 | 4.98 | 6.00 | 0.83   | 44 | 6.64 | 8.00 | 0.83   |
| 45 | 3.35 | 4.00 | 0.8375 | 45 | 5.03 | 6.00 | 0.8375 | 45 | 6.70 | 8.00 | 0.8375 |
| 46 | 3.38 | 4.00 | 0.845  | 46 | 5.07 | 6.00 | 0.845  | 46 | 6.76 | 8.00 | 0.845  |
| 47 | 3.41 | 4.00 | 0.8525 | 47 | 5.12 | 6.00 | 0.8525 | 47 | 6.82 | 8.00 | 0.8525 |
| 48 | 3.44 | 4.00 | 0.86   | 48 | 5.16 | 6.00 | 0.86   | 48 | 6.88 | 8.00 | 0.86   |
| 49 | 3.47 | 4.00 | 0.8675 | 49 | 5.21 | 6.00 | 0.8675 | 49 | 6.94 | 8.00 | 0.8675 |
| 50 | 3.50 | 4.00 | 0.875  | 50 | 5.25 | 6.00 | 0.875  | 50 | 7.00 | 8.00 | 0.875  |
| 51 | 3.53 | 4.00 | 0.8825 | 51 | 5.30 | 6.00 | 0.8825 | 51 | 7.06 | 8.00 | 0.8825 |
| 52 | 3.56 | 4.00 | 0.89   | 52 | 5.34 | 6.00 | 0.89   | 52 | 7.12 | 8.00 | 0.89   |
| 53 | 3.59 | 4.00 | 0.8975 | 53 | 5.39 | 6.00 | 0.8975 | 53 | 7.18 | 8.00 | 0.8975 |
| 54 | 3.62 | 4.00 | 0.905  | 54 | 5.43 | 6.00 | 0.905  | 54 | 7.24 | 8.00 | 0.905  |
| 55 | 3.65 | 4.00 | 0.9125 | 55 | 5.48 | 6.00 | 0.9125 | 55 | 7.30 | 8.00 | 0.9125 |
| 56 | 3.68 | 4.00 | 0.92   | 56 | 5.52 | 6.00 | 0.92   | 56 | 7.36 | 8.00 | 0.92   |
| 57 | 3.71 | 4.00 | 0.9275 | 57 | 5.57 | 6.00 | 0.9275 | 57 | 7.42 | 8.00 | 0.9275 |
| 58 | 3.74 | 4.00 | 0.935  | 58 | 5.61 | 6.00 | 0.935  | 58 | 7.48 | 8.00 | 0.935  |
| 59 | 3.77 | 4.00 | 0.9425 | 59 | 5.66 | 6.00 | 0.9425 | 59 | 7.54 | 8.00 | 0.9425 |
| 60 | 3.80 | 4.00 | 0.95   | 60 | 5.70 | 6.00 | 0.95   | 60 | 7.60 | 8.00 | 0.95   |
| 61 | 3.83 | 4.00 | 0.9575 | 61 | 5.75 | 6.00 | 0.9575 | 61 | 7.66 | 8.00 | 0.9575 |
| 62 | 3.86 | 4.00 | 0.965  | 62 | 5.79 | 6.00 | 0.965  | 62 | 7.72 | 8.00 | 0.965  |
| 63 | 3.89 | 4.00 | 0.9725 | 63 | 5.84 | 6.00 | 0.9725 | 63 | 7.78 | 8.00 | 0.9725 |

FIG.5B

| Table A | | | | Table B | | | | Table C | | | |
| (Iave<Iavecomp1) | | | | (Iavecomp1≤Iave<Iavecomp2) | | | | (Iavecomp2≤Iave) | | | |
| VFB (dec) | TIME1 (μs) | TIME2 (μs) | TIME1/TIME2 | VFB (dec) | TIME1 (μs) | TIME2 (μs) | TIME1/TIME2 | VFB (dec) | TIME1 (μs) | TIME2 (μs) | TIME1/TIME2 |
|---|---|---|---|---|---|---|---|---|---|---|---|
| 1 | 0.13 | 0.21 | 0.606251 | 1 | 0.19 | 0.32 | 0.606251 | 1 | 0.26 | 0.42 | 0.606251 |
| 2 | 0.26 | 0.42 | 0.609132 | 2 | 0.38 | 0.63 | 0.609132 | 2 | 0.51 | 0.84 | 0.609132 |
| 3 | 0.38 | 0.63 | 0.612039 | 3 | 0.58 | 0.94 | 0.612039 | 3 | 0.77 | 1.26 | 0.612039 |
| 4 | 0.51 | 0.83 | 0.614975 | 4 | 0.77 | 1.25 | 0.614975 | 4 | 1.03 | 1.67 | 0.614975 |
| 5 | 0.64 | 1.04 | 0.617939 | 5 | 0.96 | 1.56 | 0.617939 | 5 | 1.28 | 2.07 | 0.617939 |
| 6 | 0.77 | 1.24 | 0.620932 | 6 | 1.15 | 1.86 | 0.620932 | 6 | 1.54 | 2.48 | 0.620932 |
| 7 | 0.90 | 1.44 | 0.623954 | 7 | 1.35 | 2.16 | 0.623954 | 7 | 1.79 | 2.88 | 0.623954 |
| 8 | 1.03 | 1.64 | 0.627006 | 8 | 1.54 | 2.45 | 0.627006 | 8 | 2.05 | 3.27 | 0.627006 |
| 9 | 1.15 | 1.83 | 0.630087 | 9 | 1.73 | 2.75 | 0.630087 | 9 | 2.31 | 3.66 | 0.630087 |
| 10 | 1.28 | 2.02 | 0.633199 | 10 | 1.92 | 3.04 | 0.633199 | 10 | 2.56 | 4.05 | 0.633199 |
| 11 | 1.41 | 2.22 | 0.636342 | 11 | 2.12 | 3.32 | 0.636342 | 11 | 2.82 | 4.43 | 0.636342 |
| 12 | 1.54 | 2.41 | 0.639516 | 12 | 2.31 | 3.61 | 0.639516 | 12 | 3.08 | 4.81 | 0.639516 |
| 13 | 1.67 | 2.59 | 0.642722 | 13 | 2.50 | 3.89 | 0.642722 | 13 | 3.33 | 5.19 | 0.642722 |
| 14 | 1.79 | 2.78 | 0.645961 | 14 | 2.69 | 4.17 | 0.645961 | 14 | 3.59 | 5.56 | 0.645961 |
| 15 | 1.92 | 2.96 | 0.649232 | 15 | 2.88 | 4.44 | 0.649232 | 15 | 3.85 | 5.92 | 0.649232 |
| 16 | 2.05 | 3.14 | 0.652536 | 16 | 3.08 | 4.72 | 0.652536 | 16 | 4.10 | 6.29 | 0.652536 |
| 17 | 2.18 | 3.32 | 0.655875 | 17 | 3.27 | 4.98 | 0.655875 | 17 | 4.36 | 6.65 | 0.655875 |
| 18 | 2.31 | 3.50 | 0.659247 | 18 | 3.46 | 5.25 | 0.659247 | 18 | 4.62 | 7.00 | 0.659247 |
| 19 | 2.44 | 3.68 | 0.662655 | 19 | 3.65 | 5.51 | 0.662655 | 19 | 4.87 | 7.35 | 0.662655 |
| 20 | 2.56 | 3.85 | 0.666098 | 20 | 3.85 | 5.77 | 0.666098 | 20 | 5.13 | 7.70 | 0.666098 |
| 21 | 2.69 | 4.02 | 0.669576 | 21 | 4.04 | 6.03 | 0.669576 | 21 | 5.38 | 8.04 | 0.669576 |
| 22 | 2.82 | 4.19 | 0.673092 | 22 | 4.23 | 6.29 | 0.673092 | 22 | 5.64 | 8.38 | 0.673092 |
| 23 | 2.95 | 4.36 | 0.676644 | 23 | 4.42 | 6.54 | 0.676644 | 23 | 5.90 | 8.72 | 0.676644 |
| 24 | 3.08 | 4.52 | 0.680234 | 24 | 4.62 | 6.78 | 0.680234 | 24 | 6.15 | 9.05 | 0.680234 |
| 25 | 3.21 | 4.69 | 0.683863 | 25 | 4.81 | 7.03 | 0.683863 | 25 | 6.41 | 9.37 | 0.683863 |
| 26 | 3.33 | 4.85 | 0.68753 | 26 | 5.00 | 7.27 | 0.68753 | 26 | 6.67 | 9.70 | 0.68753 |
| 27 | 3.46 | 5.01 | 0.691237 | 27 | 5.19 | 7.51 | 0.691237 | 27 | 6.92 | 10.02 | 0.691237 |
| 28 | 3.59 | 5.17 | 0.694984 | 28 | 5.38 | 7.75 | 0.694984 | 28 | 7.18 | 10.33 | 0.694984 |
| 29 | 3.72 | 5.32 | 0.698772 | 29 | 5.58 | 7.98 | 0.698772 | 29 | 7.44 | 10.64 | 0.698772 |
| 30 | 3.85 | 5.47 | 0.702602 | 30 | 5.77 | 8.21 | 0.702602 | 30 | 7.69 | 10.95 | 0.702602 |

FIG.8A

| 31 | 3.97 | 5.63 | 0.706473 | 31 | 5.96 | 8.44 | 0.706473 | 31 | 7.95 | 11.25 | 0.706473 |
|---|---|---|---|---|---|---|---|---|---|---|---|
| 32 | 4.10 | 5.78 | 0.710388 | 32 | 6.15 | 8.66 | 0.710388 | 32 | 8.21 | 11.55 | 0.710388 |
| 33 | 4.23 | 5.92 | 0.714346 | 33 | 6.35 | 8.88 | 0.714346 | 33 | 8.46 | 11.85 | 0.714346 |
| 34 | 4.36 | 6.07 | 0.718349 | 34 | 6.54 | 9.10 | 0.718349 | 34 | 8.72 | 12.14 | 0.718349 |
| 35 | 4.49 | 6.21 | 0.722396 | 35 | 6.73 | 9.32 | 0.722396 | 35 | 8.97 | 12.42 | 0.722396 |
| 36 | 4.62 | 6.35 | 0.72649 | 36 | 6.92 | 9.53 | 0.72649 | 36 | 9.23 | 12.71 | 0.72649 |
| 37 | 4.74 | 6.49 | 0.73063 | 37 | 7.12 | 9.74 | 0.73063 | 37 | 9.49 | 12.98 | 0.73063 |
| 38 | 4.87 | 6.63 | 0.734818 | 38 | 7.31 | 9.94 | 0.734818 | 38 | 9.74 | 13.26 | 0.734818 |
| 39 | 5.00 | 6.77 | 0.739054 | 39 | 7.50 | 10.15 | 0.739054 | 39 | 10.00 | 13.53 | 0.739054 |
| 40 | 5.13 | 6.90 | 0.743339 | 40 | 7.69 | 10.35 | 0.743339 | 40 | 10.26 | 13.80 | 0.743339 |
| 41 | 5.26 | 7.03 | 0.747674 | 41 | 7.88 | 10.55 | 0.747674 | 41 | 10.51 | 14.06 | 0.747674 |
| 42 | 5.38 | 7.16 | 0.75206 | 42 | 8.08 | 10.74 | 0.75206 | 42 | 10.77 | 14.32 | 0.75206 |
| 43 | 5.51 | 7.29 | 0.756497 | 43 | 8.27 | 10.93 | 0.756497 | 43 | 11.03 | 14.57 | 0.756497 |
| 44 | 5.64 | 7.41 | 0.760988 | 44 | 8.46 | 11.12 | 0.760988 | 44 | 11.28 | 14.83 | 0.760988 |
| 45 | 5.77 | 7.54 | 0.765532 | 45 | 8.65 | 11.30 | 0.765532 | 45 | 11.54 | 15.07 | 0.765532 |
| 46 | 5.90 | 7.66 | 0.77013 | 46 | 8.85 | 11.49 | 0.77013 | 46 | 11.79 | 15.32 | 0.77013 |
| 47 | 6.03 | 7.78 | 0.774784 | 47 | 9.04 | 11.67 | 0.774784 | 47 | 12.05 | 15.55 | 0.774784 |
| 48 | 6.15 | 7.89 | 0.779495 | 48 | 9.23 | 11.84 | 0.779495 | 48 | 12.31 | 15.79 | 0.779495 |
| 49 | 6.28 | 8.01 | 0.784264 | 49 | 9.42 | 12.02 | 0.784264 | 49 | 12.56 | 16.02 | 0.784264 |
| 50 | 6.41 | 8.12 | 0.789091 | 50 | 9.62 | 12.19 | 0.789091 | 50 | 12.82 | 16.25 | 0.789091 |
| 51 | 6.54 | 8.24 | 0.793978 | 51 | 9.81 | 12.35 | 0.793978 | 51 | 13.08 | 16.47 | 0.793978 |
| 52 | 6.67 | 8.34 | 0.798925 | 52 | 10.00 | 12.52 | 0.798925 | 52 | 13.33 | 16.69 | 0.798925 |
| 53 | 6.79 | 8.45 | 0.803935 | 53 | 10.19 | 12.68 | 0.803935 | 53 | 13.59 | 16.90 | 0.803935 |
| 54 | 6.92 | 8.56 | 0.809008 | 54 | 10.38 | 12.84 | 0.809008 | 54 | 13.85 | 17.11 | 0.809008 |
| 55 | 7.05 | 8.66 | 0.814146 | 55 | 10.58 | 12.99 | 0.814146 | 55 | 14.10 | 17.32 | 0.814146 |
| 56 | 7.18 | 8.76 | 0.819349 | 56 | 10.77 | 13.14 | 0.819349 | 56 | 14.36 | 17.52 | 0.819349 |
| 57 | 7.31 | 8.86 | 0.824619 | 57 | 10.96 | 13.29 | 0.824619 | 57 | 14.62 | 17.72 | 0.824619 |
| 58 | 7.44 | 8.96 | 0.829957 | 58 | 11.15 | 13.44 | 0.829957 | 58 | 14.87 | 17.92 | 0.829957 |
| 59 | 7.56 | 9.05 | 0.835365 | 59 | 11.35 | 13.58 | 0.835365 | 59 | 15.13 | 18.11 | 0.835365 |
| 60 | 7.69 | 9.15 | 0.840844 | 60 | 11.54 | 13.72 | 0.840844 | 60 | 15.38 | 18.30 | 0.840844 |
| 61 | 7.82 | 9.24 | 0.846395 | 61 | 11.73 | 13.86 | 0.846395 | 61 | 15.64 | 18.48 | 0.846395 |
| 62 | 7.95 | 9.33 | 0.85202 | 62 | 11.92 | 13.99 | 0.85202 | 62 | 15.90 | 18.66 | 0.85202 |
| 63 | 8.08 | 9.42 | 0.85772 | 63 | 12.12 | 14.13 | 0.85772 | 63 | 16.15 | 18.83 | 0.85772 |

FIG.8B

| Table A | | | | Table B | | | | Table C | | | |
| (Iave<Iavecomp1) | | | | (Iavecomp1≤Iave<Iavecomp2) | | | | (Iavecomp2≤Iave) | | | |
| VFB (dec) | TIME1 ($\mu$s) | TIME2 ($\mu$s) | TIME1/ TIME2 | VFB (dec) | TIME1 ($\mu$s) | TIME2 ($\mu$s) | TIME1/ TIME2 | VFB (dec) | TIME1 ($\mu$s) | TIME2 ($\mu$s) | TIME1/ TIME2 |
|---|---|---|---|---|---|---|---|---|---|---|---|
| 1 | 3.00 | 4.00 | 0.75 | 1 | 3.05 | 6.00 | 0.5075 | 1 | 4.06 | 8.00 | 0.5075 |
| 2 | 3.00 | 4.00 | 0.75 | 2 | 3.09 | 6.00 | 0.515 | 2 | 4.12 | 8.00 | 0.515 |
| 3 | 3.00 | 4.00 | 0.75 | 3 | 3.14 | 6.00 | 0.5225 | 3 | 4.18 | 8.00 | 0.5225 |
| 4 | 3.00 | 4.00 | 0.75 | 4 | 3.18 | 6.00 | 0.53 | 4 | 4.24 | 8.00 | 0.53 |
| 5 | 3.00 | 4.00 | 0.75 | 5 | 3.23 | 6.00 | 0.5375 | 5 | 4.30 | 8.00 | 0.5375 |
| 6 | 3.00 | 4.00 | 0.75 | 6 | 3.27 | 6.00 | 0.545 | 6 | 4.36 | 8.00 | 0.545 |
| 7 | 3.00 | 4.00 | 0.75 | 7 | 3.32 | 6.00 | 0.5525 | 7 | 4.42 | 8.00 | 0.5525 |
| 8 | 3.00 | 4.00 | 0.75 | 8 | 3.36 | 6.00 | 0.56 | 8 | 4.48 | 8.00 | 0.56 |
| 9 | 3.00 | 4.00 | 0.75 | 9 | 3.41 | 6.00 | 0.5675 | 9 | 4.54 | 8.00 | 0.5675 |
| 10 | 3.00 | 4.00 | 0.75 | 10 | 3.45 | 6.00 | 0.575 | 10 | 4.60 | 8.00 | 0.575 |
| 11 | 3.00 | 4.00 | 0.75 | 11 | 3.50 | 6.00 | 0.5825 | 11 | 4.66 | 8.00 | 0.5825 |
| 12 | 3.00 | 4.00 | 0.75 | 12 | 3.54 | 6.00 | 0.59 | 12 | 4.72 | 8.00 | 0.59 |
| 13 | 3.00 | 4.00 | 0.75 | 13 | 3.59 | 6.00 | 0.5975 | 13 | 4.78 | 8.00 | 0.5975 |
| 14 | 3.00 | 4.00 | 0.75 | 14 | 3.63 | 6.00 | 0.605 | 14 | 4.84 | 8.00 | 0.605 |
| 15 | 3.00 | 4.00 | 0.75 | 15 | 3.68 | 6.00 | 0.6125 | 15 | 4.90 | 8.00 | 0.6125 |
| 16 | 3.00 | 4.00 | 0.75 | 16 | 3.72 | 6.00 | 0.62 | 16 | 4.96 | 8.00 | 0.62 |
| 17 | 3.00 | 4.00 | 0.75 | 17 | 3.77 | 6.00 | 0.6275 | 17 | 5.02 | 8.00 | 0.6275 |
| 18 | 3.00 | 4.00 | 0.75 | 18 | 3.81 | 6.00 | 0.635 | 18 | 5.08 | 8.00 | 0.635 |
| 19 | 3.00 | 4.00 | 0.75 | 19 | 3.86 | 6.00 | 0.6425 | 19 | 5.14 | 8.00 | 0.6425 |
| 20 | 3.00 | 4.00 | 0.75 | 20 | 3.90 | 6.00 | 0.65 | 20 | 5.20 | 8.00 | 0.65 |
| 21 | 3.00 | 4.00 | 0.75 | 21 | 3.95 | 6.00 | 0.6575 | 21 | 5.26 | 8.00 | 0.6575 |
| 22 | 3.00 | 4.00 | 0.75 | 22 | 3.99 | 6.00 | 0.665 | 22 | 5.32 | 8.00 | 0.665 |
| 23 | 3.00 | 4.00 | 0.75 | 23 | 4.04 | 6.00 | 0.6725 | 23 | 5.38 | 8.00 | 0.6725 |
| 24 | 3.00 | 4.00 | 0.75 | 24 | 4.08 | 6.00 | 0.68 | 24 | 5.44 | 8.00 | 0.68 |
| 25 | 3.00 | 4.00 | 0.75 | 25 | 4.13 | 6.00 | 0.6875 | 25 | 5.50 | 8.00 | 0.6875 |
| 26 | 3.00 | 4.00 | 0.75 | 26 | 4.17 | 6.00 | 0.695 | 26 | 5.56 | 8.00 | 0.695 |
| 27 | 3.00 | 4.00 | 0.75 | 27 | 4.22 | 6.00 | 0.7025 | 27 | 5.62 | 8.00 | 0.7025 |
| 28 | 3.00 | 4.00 | 0.75 | 28 | 4.26 | 6.00 | 0.71 | 28 | 5.68 | 8.00 | 0.71 |
| 29 | 3.00 | 4.00 | 0.75 | 29 | 4.31 | 6.00 | 0.7175 | 29 | 5.74 | 8.00 | 0.7175 |
| 30 | 3.00 | 4.00 | 0.75 | 30 | 4.35 | 6.00 | 0.725 | 30 | 5.80 | 8.00 | 0.725 |

FIG.11A

| 31 | 3.00 | 4.00 | 0.75 | 31 | 4.40 | 6.00 | 0.7325 | 31 | 5.86 | 8.00 | 0.7325 |
|---|---|---|---|---|---|---|---|---|---|---|---|
| 32 | 3.00 | 4.00 | 0.75 | 32 | 4.44 | 6.00 | 0.74 | 32 | 5.92 | 8.00 | 0.74 |
| 33 | 3.00 | 4.00 | 0.75 | 33 | 4.49 | 6.00 | 0.7475 | 33 | 5.98 | 8.00 | 0.7475 |
| 34 | 3.02 | 4.00 | 0.755 | 34 | 4.53 | 6.00 | 0.755 | 34 | 6.04 | 8.00 | 0.755 |
| 35 | 3.05 | 4.00 | 0.7625 | 35 | 4.58 | 6.00 | 0.7625 | 35 | 6.10 | 8.00 | 0.7625 |
| 36 | 3.08 | 4.00 | 0.77 | 36 | 4.62 | 6.00 | 0.77 | 36 | 6.16 | 8.00 | 0.77 |
| 37 | 3.11 | 4.00 | 0.7775 | 37 | 4.67 | 6.00 | 0.7775 | 37 | 6.22 | 8.00 | 0.7775 |
| 38 | 3.14 | 4.00 | 0.785 | 38 | 4.71 | 6.00 | 0.785 | 38 | 6.28 | 8.00 | 0.785 |
| 39 | 3.17 | 4.00 | 0.7925 | 39 | 4.76 | 6.00 | 0.7925 | 39 | 6.34 | 8.00 | 0.7925 |
| 40 | 3.20 | 4.00 | 0.8 | 40 | 4.80 | 6.00 | 0.8 | 40 | 6.40 | 8.00 | 0.8 |
| 41 | 3.23 | 4.00 | 0.8075 | 41 | 4.85 | 6.00 | 0.8075 | 41 | 6.46 | 8.00 | 0.8075 |
| 42 | 3.26 | 4.00 | 0.815 | 42 | 4.89 | 6.00 | 0.815 | 42 | 6.52 | 8.00 | 0.815 |
| 43 | 3.29 | 4.00 | 0.8225 | 43 | 4.94 | 6.00 | 0.8225 | 43 | 6.58 | 8.00 | 0.8225 |
| 44 | 3.32 | 4.00 | 0.83 | 44 | 4.98 | 6.00 | 0.83 | 44 | 6.64 | 8.00 | 0.83 |
| 45 | 3.35 | 4.00 | 0.8375 | 45 | 5.03 | 6.00 | 0.8375 | 45 | 6.70 | 8.00 | 0.8375 |
| 46 | 3.38 | 4.00 | 0.845 | 46 | 5.07 | 6.00 | 0.845 | 46 | 6.76 | 8.00 | 0.845 |
| 47 | 3.41 | 4.00 | 0.8525 | 47 | 5.12 | 6.00 | 0.8525 | 47 | 6.82 | 8.00 | 0.8525 |
| 48 | 3.44 | 4.00 | 0.86 | 48 | 5.16 | 6.00 | 0.86 | 48 | 6.88 | 8.00 | 0.86 |
| 49 | 3.47 | 4.00 | 0.8675 | 49 | 5.21 | 6.00 | 0.8675 | 49 | 6.94 | 8.00 | 0.8675 |
| 50 | 3.50 | 4.00 | 0.875 | 50 | 5.25 | 6.00 | 0.875 | 50 | 7.00 | 8.00 | 0.875 |
| 51 | 3.53 | 4.00 | 0.8825 | 51 | 5.30 | 6.00 | 0.8825 | 51 | 7.06 | 8.00 | 0.8825 |
| 52 | 3.56 | 4.00 | 0.89 | 52 | 5.34 | 6.00 | 0.89 | 52 | 7.12 | 8.00 | 0.89 |
| 53 | 3.59 | 4.00 | 0.8975 | 53 | 5.39 | 6.00 | 0.8975 | 53 | 7.18 | 8.00 | 0.8975 |
| 54 | 3.62 | 4.00 | 0.905 | 54 | 5.43 | 6.00 | 0.905 | 54 | 7.24 | 8.00 | 0.905 |
| 55 | 3.65 | 4.00 | 0.9125 | 55 | 5.48 | 6.00 | 0.9125 | 55 | 7.30 | 8.00 | 0.9125 |
| 56 | 3.68 | 4.00 | 0.92 | 56 | 5.52 | 6.00 | 0.92 | 56 | 7.36 | 8.00 | 0.92 |
| 57 | 3.71 | 4.00 | 0.9275 | 57 | 5.57 | 6.00 | 0.9275 | 57 | 7.42 | 8.00 | 0.9275 |
| 58 | 3.74 | 4.00 | 0.935 | 58 | 5.61 | 6.00 | 0.935 | 58 | 7.48 | 8.00 | 0.935 |
| 59 | 3.77 | 4.00 | 0.9425 | 59 | 5.66 | 6.00 | 0.9425 | 59 | 7.54 | 8.00 | 0.9425 |
| 60 | 3.80 | 4.00 | 0.95 | 60 | 5.70 | 6.00 | 0.95 | 60 | 7.60 | 8.00 | 0.95 |
| 61 | 3.83 | 4.00 | 0.9575 | 61 | 5.75 | 6.00 | 0.9575 | 61 | 7.66 | 8.00 | 0.9575 |
| 62 | 3.86 | 4.00 | 0.965 | 62 | 5.79 | 6.00 | 0.965 | 62 | 7.72 | 8.00 | 0.965 |
| 63 | 3.89 | 4.00 | 0.9725 | 63 | 5.84 | 6.00 | 0.9725 | 63 | 7.78 | 8.00 | 0.9725 |

FIG.11B

POWER SOURCE DEVICE AND IMAGE FORMING APPARATUS

FIELD OF THE INVENTION AND RELATED ART

The present invention relates to a power source device using a flyback transformer of an active clamp type and an image forming apparatus including the power source device.

A winding power source device including the flyback transformer of the active clamp type operates in the following manner. That is, primary-side two switching element are alternately turned on and off, so that while transmitting a part of energy accumulated in the transformer by a flyback operation to a secondary side, remaining energy is resonated in a primary side to subject the switching elements to zero voltage switching. As a result, the switching power source device using the active clamp type realizes a high electric power conversion efficiency and a low noise.

In order to effect the zero voltage switching, it is known that a condition concerning on-times of the two switching elements exists and depends on a magnitude of a load in a secondary side. For example, in Japanese Laid-Open Patent Application (JP-A) Heill-187664, a constitution in which the zero voltage switching is maintained at any load by controlling the on-times of the two switching elements depending on the magnitude of the secondary-side load has been proposed. As a method of detecting the magnitude of the secondary-side load, in JP-A HEill-187664, an example in which the magnitude of the load is detected by detection of a load current value in the secondary side is disclosed.

A controller for controlling the two switching elements provided in the primary side is provided in the primary side in general. For that reason, in the case of a constitution of detecting a secondary-side load current, there is a need to provide a transmitting circuit for transmitting information on the detected load current to the primary side, so that a size of the circuit increases and thus a cost increases. Further, in the case of the constitution of detecting the secondary-side load current, there is a problem such that loss in detected resistance generates.

SUMMARY OF THE INVENTION

The present invention enables that zero voltage switching is carried out efficiently with a simple constitution.

According to an aspect of the present invention, there is provided a power source device comprising: a transformer including a primary winding and a secondary winding; a first switch portion connected with the primary winding in series; a circuit including a capacitor and a second switch portion connected in series and connected with the primary winding in parallel; a controller for controlling conduction between the first switch portion and the second switch portion, wherein the first switch portion and the second switch portion are alternately conducted to generate an output voltage at a secondary side of the transformer, a detecting portion for detecting a current flowing through the first switch portion, wherein the controller controls conduction of the first switch portion and the second switch portion so that a value of the current detected by the detecting portion does not exceed a threshold depending on conduction times of the first switch portion and second switch portion.

According to another aspect of the present invention, there is provided an image forming apparatus comprising: an image forming portion for forming an image; and a power source device for supplying electric power to the image forming apparatus, wherein the power source device including, a transformer including a primary winding and a secondary winding, a first switch portion connected with the primary winding in series, a circuit including a capacitor and a second switch portion connected in series and connected with the primary winding in parallel, a controller for controlling conduction between the first switch portion and the second switch portion, wherein the first switch portion and the second switch portion are alternately conducted to generate an output voltage at a secondary side of the transformer, a detecting portion for detecting a current flowing through the first switch portion, wherein the controller controls conduction of the first switch portion and the second switch portion so that a value of the current detected by the detecting portion does not exceed a threshold depending on conduction times of the first switch portion and second switch portion.

Further features of the present invention will become apparent from the following description of exemplary embodiments with reference to the attached drawings.

DESCRIPTION OF THE EMBODIMENTS

Embodiments of the present invention will be described specifically with reference to the drawings.

[Embodiment 1]

[Circuit Constitution of Power Source]

As a switching power source in Embodiment 1, a power source including a flyback power source using an active clamp type will be described using a circuit diagram of FIG. 1. A circuit of the switching power source in this embodiment will be described as a switching power source circuit 100.

Figure 1:
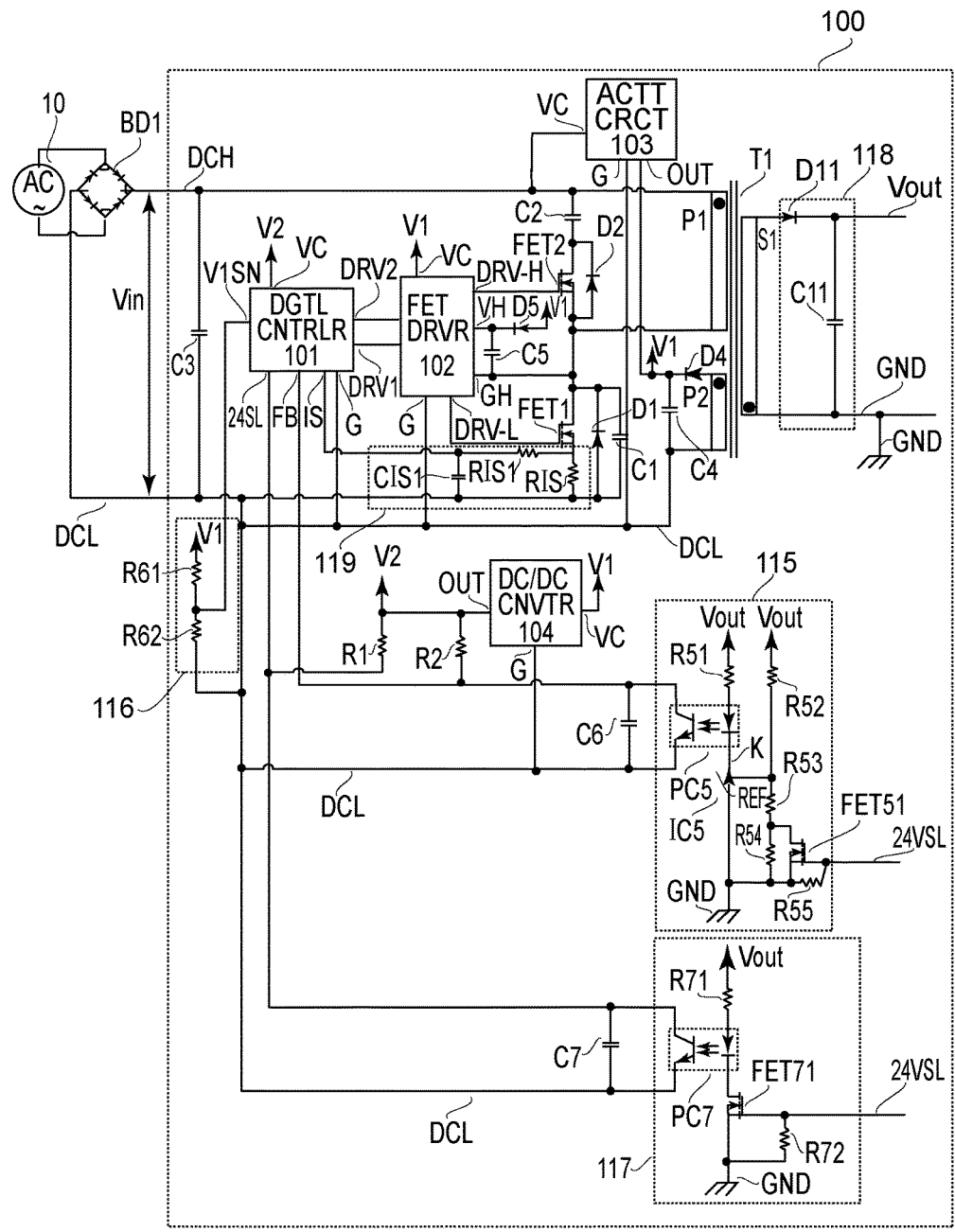
FIG. 1 is a circuit diagram of a power source device in Embodiments 1 to 3.

In FIG. 1, an AC voltage inputted from an AC power source 10 (i.e., a commercial power source) is rectified by a bridge diode BD1 which is a full-wave rectifying means, and is inputted into the switching power source circuit 100. A smoothing capacitor C3 as a smoothing means smooths the voltage rectified by the bridge diode BD1. In FIG. 1, a low potential-side of the smoothing capacitor C3 is DCL, and a high potential-side of the smoothing capacitor C3 is DCH.

The switching power source circuit 100 outputs an output voltage Vout from the voltage Vin charged in the smoothing capacitor C3 to a secondary switch of an insulating transformer T1. In this embodiment, as the output voltage Vout, for example, a digital controller voltage of 24 V or a DC voltage of 4 V is used. The switching power source circuit 100 includes the insulating transformer T1 in which a primary winding P1 and an auxiliary winding Ps are provided in a primary side and in which a secondary winding S1 is provided in the secondary side.

From the primary winding P1 to the secondary winding S1 of the transformer T1, electric power is supplied by a switching operation described later. In the auxiliary winding P2 of the transformer T1, a voltage (forward voltage) is generated by the input voltage Vin applied to the primary winding P1, and the generated voltage is rectified and smoothed by a diode D4 and a capacitor C4, and is supplied as a voltage V1.

(Two FETs for Switching)

In a primary switch of the transformer T1 of the switching power source circuit 100, a field-effect transistor 1 (FET1), a field-effect transistor 2 (FET2), a capacitor C2, a digital controller 101 and a FET driving portion 102 are provided. The FET1 is a first switch means series-connected with the primary winding P1 of the transformer T1. The FET2 as a second switching means is series-connected with the capacitor C2 for voltage clamp(ing) which is a first capacitor. Further, the FET2 and the capacitor C2 which are series-connected with each other are connected with the primary winding P1 of the transformer T1 in parallel. The digital controller 101 as a control means effects control of the FETs 1, 2, and the FET driving portion 102 drives the FETs 1, 2 depending on an instruction from the digital controller 101. A capacitor C1 for voltage resonance which is a second capacitor is parallel-connected with the FET1 and is provided for decreasing loss during switch-off of the FETs 1, 2. Incidentally, without providing the capacitor C1, in place of the capacitor C1, a capacity between a drain terminal and a source terminal of the FET1 may also be used. Further, a diode D1 is a body diode of the FET1, and a diode D2 is a body diode of the FET2.

(Current Detecting Portion)

A current detecting portion 119 (dotted frame portion) as a first detecting means is constituted by resistors RIS, RIS1 and a capacitor CIS1. The resistor RIS is a resistor for current detection which is connected between the source terminal of the FET1 and a DCL-side terminal of the smoothing capacitor C3, and a voltage proportional to a current flowing through the resistor RIS generates between both terminals of the resistor RIS. The voltage generating between the both terminals of the resistor RIS is averaged by an integrating circuit constituted by the resistor RIS1 and the capacitor CIS1, and is inputted into an IS terminal of the digital controller 101. As a result, the digital controller 101 is capable of detecting an average value of the current flowing through the FET1.

(Digital Controller)

As the digital controller 101 in this embodiment, a calculation control means, such as a CPU (microprocessor) or an ASIC, operating with a block generated by an oscillator. As a result, complicated control described later can be realized by a simple and inexpensive circuit constitution. In this embodiment, the digital controller 101 includes a CPU (not shown) for controlling operations of the FETs 1, 2 and the like, an ROM (not shown) in which a control program is written, and an RAM (not shown) in which data used in control are stored. The control described below is executed by the CPU.

Between a VC terminal and a G terminal of the digital controller 101, a voltage V2 generated by a DC/DC converter described later is supplied. The digital controller 101 outputs, on the basis of a voltage signal inputted into the FB terminal, a control signal RRV1 which is a driving signal for driving the FET1 and a control signal DRV2 which is a driving signal for driving the FET2 to the FET driving portion 102.

(FET Driving Portion)

The FET driving portion 102 generates a gate driving signal DRV-L for driving of the FET1 on the basis of the control signal DRV1 inputted from the digital controller 101 and generates a gate driving signal DRV-H for driving the FET2 on the basis of the control signal DRV2 from the digital controller 101. The voltage V1 is supplied to between the VC terminal and the G terminal of the FET driving portion 102. Further, by a charge pump circuit constituted by a capacitor C5 and a diode D5, the voltage for driving the FET2 is supplied to between the VH terminal and the GH terminal. When the control signal DRV1 becomes a high level (High) state, the FET driving portion 102 puts the gate driving signal DRV-L of the FET1 in a High state and thus the FET1 is in an on state (conduction state). Similarly, when the control signal DRV2 becomes a High state, the FET driving portion 102 puts the gate driving signal DRV-H of the FET2 in a High state and thus the FET2 in an on state.

(DC/DC Converter, Actuating Circuit)

The DC/DC converter 104 is a 3-terminal regulator or a step-down switching power source, and generates a voltage V2 from the voltage V1 inputted between the VC terminal and the G terminal and outputs the voltage V2 from an OUT terminal. An actuating circuit 103 is a 3-terminal regulator or a step-down digital control power source and generates the voltage V1 from the input voltage Vin inputted between the VC terminal and the G terminal thereof, and outputs the voltage V1 from the OUT terminal. The actuating circuit 103 operates only in the case where the voltage V1 supplied from the auxiliary winding P1 is not more than a predetermined voltage value and is used for supplying the voltage V1 during actuation of the switching power source circuit 100.

In the secondary switch of the transformer T1 of the switching power source circuit 100, a diode D11, a capacitor C11 and a feed-back portion 115 are provided. The diode D11 and the capacitor C11 constitute a secondary-side rectifying and smoothing portion 118 of the transformer T1, and rectifies and smooths a flyback voltage generating in the secondary winding S1 of the transformer T1. The feed-back portion 115 is a feed-back means for feeding back, to the primary side, the output voltage Vout outputted at the secondary side of the transformer T1.

(Feed-Back Portion)

The feed-back portion 115 (dotted frame portion) is used for controlling the output voltage Vout to a predetermined constant voltage (hereinafter referred to as a target voltage). In this embodiment, the target voltage is 24 V or 5 V. The feed-back portion 115 is constituted by a photo-coupler PC5, a shunt regulator IC5, an FET51 and resistors R51 to R55. The resistor 55 is provided for stabilizing the FET51 in an off state even when a 24 VSL signal described later is undetermined. A voltage value of the output voltage Vout is set by a voltage-dividing ratio of a voltage inputted into a reference terminal REF of the shunt regulator IC5 (i.e., a reference voltage) to the output voltage Vout. That is, the voltage value of the output voltage Vout is set by voltage-dividing resistors R52, R53, R54.

The shunt regulator IC5 compares the voltage inputted into the reference terminal REF with the reference voltage therein, and depending on a comparison result, a cathode terminal K is in a conduction drawing the current or a non-conduction state in which the cathode terminal K does not draw the current. When the voltage of the output voltage Vout is higher than the target voltage (24 V or 5 V), the voltage inputted into the reference terminal REF becomes high. As a result, the cathode terminal K of the shunt regulator IC5 draws the current, so that the current flows through the secondary-side diode of the photo-coupler PC5 via a pull-up resistor R51 and thus the shunt regulator IC5 is in an on state and emits light. As a result, a primary-side photo-transistor of the photo-coupler PC5 operates and when is in the on state, electric charges charged in a capacitor C6 are discharged, so that the input voltage of the FB terminal of the digital controller 101 lowers. On the other hand, when the voltage of the output voltage Vout is lower than the target voltage, the input voltage of the reference terminal REF lowers, so that the cathode terminal K of the shunt regulator IC5 does not draw the current. As a result, the current does not flow through the secondary-side diode of the photo-coupler PC5, and the shunt regulator IC5 is in the off state, so that also the primary-side transistor of the photo-coupler PC5 is in the off state. As a result, from the voltage V2 outputted from the DC/DC converter 104, a charging current flows through the capacitor C6 via the resistor R2, so that the capacitor 6 is charged, and therefore the input voltage of the FB terminal of the digital controller 101 increases. Thus, the digital controller 101 detects the input voltage of the FB terminal and effects the feed-back control for controlling the output voltage Vout to be maintained at the target voltage.

(Target Voltage Switching Portion)

A target voltage switching portion 117 (dotted frame portion) as a switching means for switching the target voltage is constituted by a photo-coupler PC7, an FET71, and resistors R71, R72. The resistor R72 is provided for stabilizing the FET71 in the off state even when the 24 VSL signal (described later) indicating the output voltage Vout is undetermined. The target voltage switching portion 117 switches, depending on the 24 VSL signal, a state in which 24 V as a first target voltage is outputted (in the case where the 24 VSL signal is High) and a state in which 5 V as a second target voltage is outputted (in the case where the 24 VSL signal is Low). When the 24 VSL signal is in the High state, the FET71 is in the on state, so that the current flows through the secondary-side diode of the photo-coupler PC7 via a pull-up resistor R71 and thus the photo-coupler IC7 is in an on state and emits light. As a result, a primary-side photo-transistor of the photo-coupler PC7 operates and when is in the on state, electric charges charged in a capacitor C7 are discharged, so that the input voltage of a 24 SL terminal of the digital controller 101 is in a Low state. On the other hand, when the 24 VSL signal is in the Low state, the FET71 is in the off state, so that also the secondary-side diode and the primary-side transistor of the photo-coupler PC7 are in the off state. As a result, from the voltage V2 outputted from the DC/DC converter 104, a charging current flows through the capacitor C7 via the resistor R1, so that the capacitor 7 is charged, and therefore the input voltage of the 24 SL terminal of the digital controller 101 is in the High state. Thus, the digital controller 101 can detect, depending on the input voltage of the 24 SL terminal, whether the target voltage is 24 V or 5 V.

The 25 VSL signal is inputted into not only the target voltage switching portion 117 but also the above-described feed-back portion 115. When the 24 VSL signal inputted into the feed-back portion 115 is in the High state, the FET51 is in the on state, so that the resistor R54 is short-circuited (i.e., the current does not flow through the resistor R54). As a result, the voltage-dividing ratio of the reference voltage (voltage inputted into the reference terminal REF) of the shunt regulator IC5 to the output voltage Vout lowers, so that a state in which 24 V is outputted as the output voltage Vout is formed. On the other hand, when the 24 VSL signal is in the Low state, the FET51 is in the off state, and the resistors R53, R54 are connected in series with each other, so that the voltage-dividing ratio of the reference voltage to the output voltage Vout increases and a state in which 5 V is outputted as the output voltage Vout is formed. In this embodiment, when the switching power source circuit 100 is in a sleep (Sleep) state (in the case where the secondary-side load of the transformer T1 is a light load), the target voltage of the output voltage Vout is set at 5 V. On the other hand, when the switching power source circuit 100 is in a ready (Ready) state (in the case where the secondary-side load of the transformer T1 is a heavy load), the target voltage of the output voltage Vout is set at 24 V.

(Input Voltage Detecting Portion)

An input voltage detecting portion 116 as a second detecting means is constituted by voltage-dividing resistors R61, R62. The input voltage detecting portion 116 divides the voltage V1, generated in an auxiliary winding P2 of the transformer T1 by the input voltage Vin, by the voltage-dividing resistors R61, R62, and a resultant voltage obtained by the voltage division is inputted into a V1SN terminal of the digital controller 101. As a result, the digital controller 101 can detect a voltage of the input voltage Vin by the input voltage of the V1SN terminal.

[Operation of Switching Power Source Circuit]

Figure 2A:
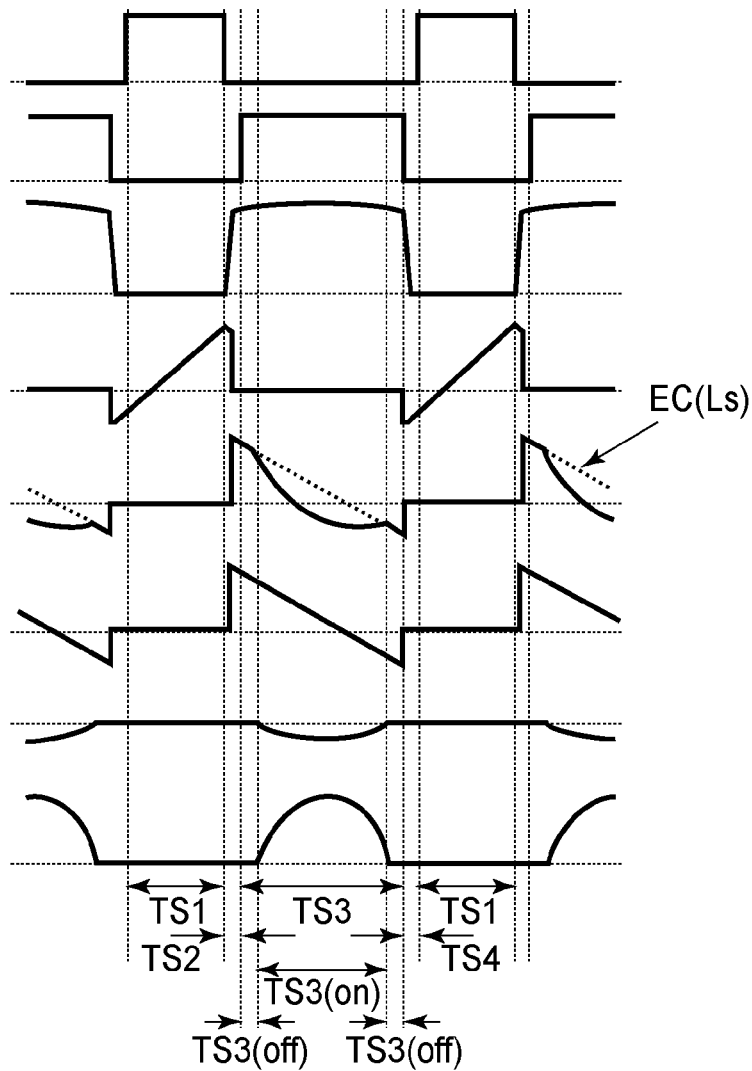
FIG. 2A is a waveform diagram showing operation waveforms of the power source device in Embodiments 1 to 3.

Then, an operation of the switching power source circuit 100 in this embodiment will be described using FIG. 2. The above-described switching power source circuit 100 alternately turns on and off the FETs 1, 2 via a dead time when the two FETs are in the off state, and thus supplies the electric power to the secondary switch of the transformer T1. FIG. 2A shows voltage waveforms or current waveforms of the FET1, the FET2, the transformer T1 and the secondary-side diode D11 of the transformer T1, in which each voltage waveform is divided into a plurality of periods corresponding to the on state or the off state of the FET1 or the FET2. In the figure, the abscissa is a time, and the ordinate is a voltage value or a current value.

Figure 2B:
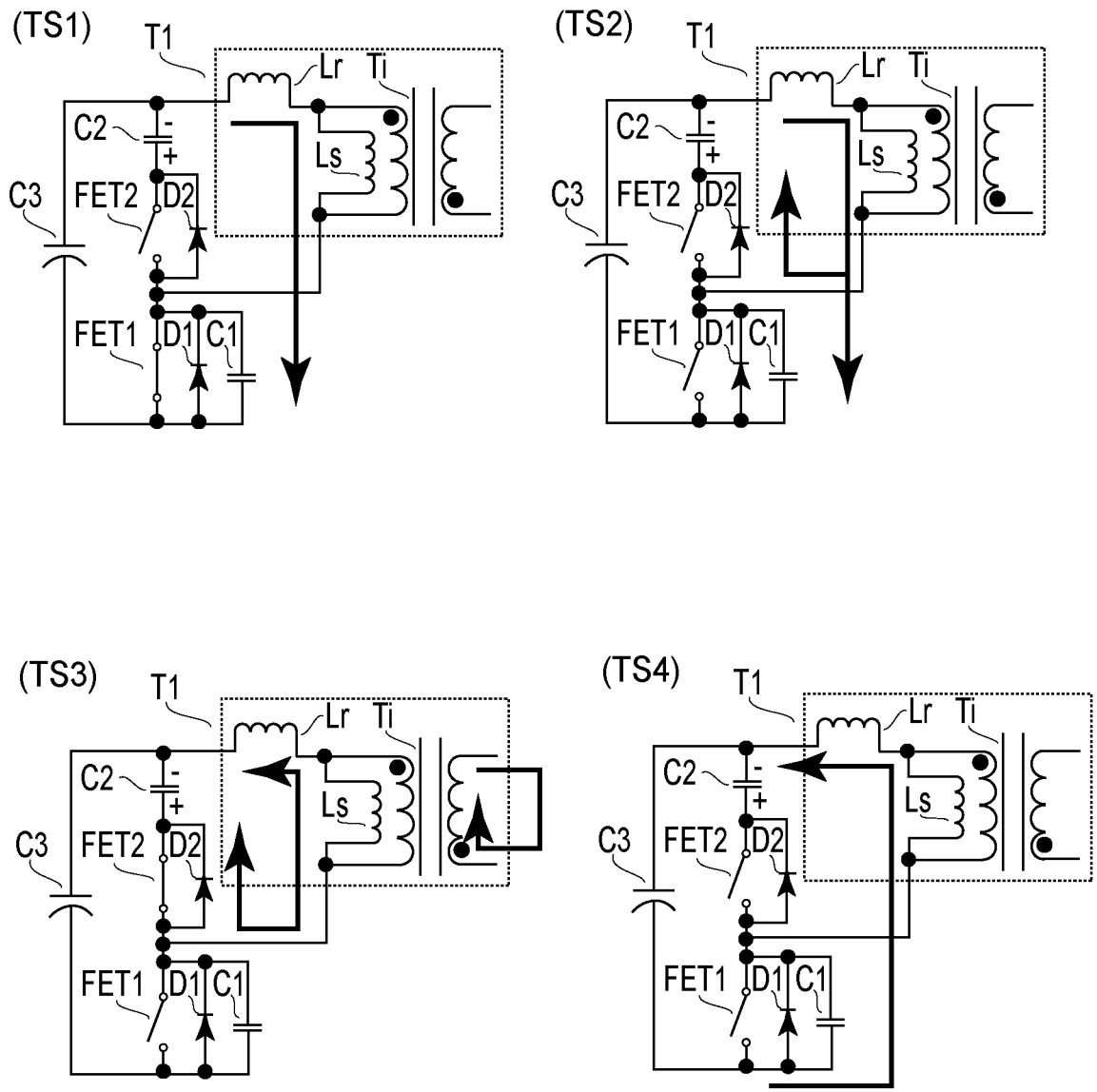
FIG. 2B is a circuit diagram for illustrating a circuit operation in Embodiments 1 to 3.

In FIG. 2A, (a) shows the voltage waveform of the FET1 between the gate terminal and the source terminal, and this voltage waveform is also a voltage waveform of the gate driving signal VRV-L outputted from the FET driving portion 102 to the gate terminal of the FET1. In FIG. 2A, (b)

shows the voltage waveform of the FET2 between the gate terminal and the source terminal, and this voltage waveform is also a voltage waveform of the gate driving signal VRV-H outputted from the FET driving portion 102 to the gate terminal of the FET2. In FIG. 2A, (c) shows the voltage waveform of the FET1 between the drain terminal and the source terminal, and (d) shows the voltage waveform of the FET2 between the drain terminal and the source terminal. Incidentally, in the voltage waveform shown in (d) of FIG. 2A, also the diode D1 as the body diode of the FET1 and the current flowing through the capacitor C1 are included. In FIG. 2A, (e) shows the current waveform of the current flowing through the drain terminal of the FET2, in which also the current flowing through the diode D2 as the body diode of the FET2 is included. In FIG. 2A, (f) shows the current waveform showing an exciting current component flowing through the excitation inductance, of the current waveform of the current flowing through the drain terminal of the FET2. In FIG. 2A, (g) shows the current waveform of the current flowing through an ideal transformer T1 described later, and (h) shows the current waveform of the current flowing through the secondary-side diode D11 of the transformer T1. Further, periods TS1 to TS4, a period TS3(on) and a period TS3(off) are periods each corresponding to a state of the FET1 or the FET2. FIG. 2B includes simple circuit diagrams showing flows of currents in the periods TS1 to TS4, in which the transformer T1 and a peripheral circuit are shown. In FIG. 2B, the transformer T1 shown in a division manner into a leakage inductance Lr, an excitation inductance Ls and an ideal transformer T1. In the following a circuit operation of the switching power source circuit 100 in each of the periods will be described using FIGS. 2A, 2B.

(Circuit Operation in Period TS1)

First, the period TS1 is a period in which the gate driving signal DRV-L sent to the FET1 is in the High state ((a) of FIG. 2A), and the FET1 is in the on state. The FET1 is put in the on state, and the current flows from the smoothing capacitor C3 to the primary winding P1, so that energy is accumulated in the leakage inductance Lr and the excitation inductance Ls ((TS1) of FIG. 2B). At this time, the voltage between the drain terminal and the source terminal of the FET1 is almost zero ((c) of FIG. 2A), so that a drain current flowing through the FET1 linearly increases ((d) of FIG. 2A).

(Circuit Operation of Period TS2)

Next, the period TS2 is a period in which both of the FET1 and the FET2 are in the off state, i.e., in a dead time state. The state of the gate driving signal DRV-L sent to the FET1 changes from the High state to the Low state and thus when the FET1 is in the off state, the current flowing through the primary winding P1 of the transformer T1 flows so as to charge the capacitor C1 for the voltage resonance ((TS2) of FIG. 2B). With the charge of the capacitor C1, the voltage between the drain terminal and the source terminal of the FET1 increases ((c) of FIG. 2A), so that the voltage between the drain terminal and the source terminal of the FET1 is higher than a voltage of the + terminal of the capacitor 2 for the voltage clamp. Then, the current flowing through the primary winding P1 of the transformer T1 starts to flow so as to charge the capacitor C2 via the diode D2 ((TS2) of FIG. 2B). As a result, a kickback voltage due to the leakage inductance Lr is absorbed by the capacitor C2, and therefore it is possible to suppress a surge voltage applied between the drain terminal and the source terminal of the FET1. Further, the voltage between the drain terminal and the source terminal of the FET1 becomes almost zero, and therefore, when the period is changed to the period TS3 and the FET2 is turned on in this state, the zero voltage switching of the FET2 can be realized.

Here, a length (time) of the period TS2 may preferably be set so as to substantially equal to or somewhat longer than a time from the turning-off of the FET1 to substantially zero voltage between the drain terminal and the source terminal of the FET2. When the period TS2 is long, a period in which the current flows through the diode D2 becomes long, and therefore useless electric power is consumed correspondingly to the time which became long. On the other hand, the FET2 is turned on before the voltage between the drain terminal and the source terminal of the FET2 becomes zero, and therefore the zero voltage switching cannot be carried out and the useless electric power is consumed similarly. Accordingly, by setting the length of the period TS2 at a proper value, it is possible to suppress an increase in electric power consumption.

(Circuit Operation in Period TS3)

Then, the period TS3 is a period in which the gate driving signal DRV-H sent to the FET2 is in the High state ((b) of FIG. 2A), and the FET1 is in the on state. In the period TS2, the current flows via the diode D2 and charges the capacitor C2 for the voltage clamp, and then in the period TS3 in which the FET2 is in the on state, the current flows via the FET2 ((TS3) of FIG. 2B). Then, when the voltage of the capacitor C2 increases, the secondary-side diode D11 of the transformer T1 is in the on state, so that a state in which the electric power is supplied to the secondary side of the switching power source circuit 100 via the secondary winding S1 of the transformer T1 is formed. Here, in the drain current of the FET2 shown in (e) of FIG. 2A, a waveform indicated by a dotted line shows the exciting current flowing through the excitation inductance Ls of the transformer T1. The current waveform of the drain current of the FET2 shown in (e) of FIG. 2A includes the current waveform of the exciting current flowing through the excitation inductance Ls of the transformer T1 shown in (f) of FIG. 2A and the current waveform of the current flowing through the ideal transformer T1 shown in 8g) of FIG. 24, i.e., is the current waveform of the sum of the exciting current of (f) of the FIG. 2A and the current of (g) of FIG. 2A. As shown in (f) of FIG. 2A, the exciting current linearly decreases in the period TS3. Further, the waveform of the current flowing through the ideal transformer T1 shown in 8g) of FIG. 2A and the waveform of the current flowing through the diode D11 shown in (h) of FIG. 2A are different in scale of the current value, and therefore are different from each other, but are similar figures in actuality.

The period TS3 is constituted by the period in which the electric power is not supplied to the secondary side (i.e., the period TS3(off) shown in FIG. 2A) and the period in which the electric power is supplied to the secondary side (i.e., the period TS3(on) shown in FIG. 2A). In the period TS3(off), the current flows through the FET2 principally by a resonance operation of the capacitor C2 for the voltage clamp with the leakage inductance Lr and the excitation inductance Ls of the transformer T1. On the other hand, in the period TS3(on), the current flows through the FET2 principally by a resonance operation of the capacitor C2 for the voltage clamp with the leakage inductance of the transformer T1. An inductance value of the leakage inductance Lr is considerably smaller than that of the excitation inductance Ls, and therefore a resonance frequency in the period TS3(on) is considerably higher than that in the period TS3(off). When the exciting current flowing through the excitation inductance Ls of the transformer T1 is zero, it means that all the energy accumulated in the excitation inductance Ls is released (eliminated). Thereafter, when the FET2 is continuously kept in the on state, the exciting current starts to flow from the + terminal of the capacitor C2 for the voltage clamp toward the excitation inductance Ls, so that the energy is accumulated again in the excitation inductance Ls ((TS3) of FIG. 2B).

(Circuit Operation of Period TS4)

Then, the period TS4 is again a period in which both of the FET1 and the FET2 are in the off state, i.e., in a dead time state. The state of the gate driving signal DRV-H sent to the FET2 changes from the High state to the Low state and thus the FET1 is in the off state. Then, the current flowing through the primary winding P1 of the transformer T1 flows so as to discharge the electric charges charged in the capacitor C1 for the voltage resonance ((TS4) of FIG. 2B). With the discharge of the capacitor C1, the voltage between the drain terminal and the source terminal of the FET1 decreases ((c) of FIG. 2A).

When the voltage between the drain terminal and the source terminal of the FET1 is below the zero voltage, the current flowing through the primary winding P1 of the transformer T1 ((TS4) of FIG. 2B). In this state, the gate driving signal DRV-L sent to the FET1 is in the High state, and when the period is returned to the period TS1, the FET1 is in the on state, so that the zero voltage switching of the FET1 can be realized.

Also, a length (time) of the period TS4 may preferably be set, similarly as in the case of the period TS2, so as to substantially equal to or somewhat longer than a time from the turning-off of the FET2 to substantially zero voltage between the drain terminal and the source terminal of the FET1. As a result, the increase in electric power consumption can be suppressed. As described above, the switching power source circuit 100 repeats the circuit operation from the period TS1 to the period TS4, so that the switching power source circuit 100 is capable of carrying out the zero voltage switching of the FET1 and the FET2 while suppressing the surge voltage due to the leakage inductance Lr.

[Control of Output Voltage]

Then, a control method of the output voltage Vout which is the secondary-side output voltage of the transformer T1 will be described. First, in the switching power source circuit 100 in this embodiment, the output voltage Vout is roughly represented by the following formula (1).

$$V_{out} = \frac{TIME1}{TIME2} \cdot V_{in} / N_r \qquad (1)$$

In the formula (1), a time TIME1 is an on-time (conduction time) of the FET1, a time TIME2 is an on-time (conduction time) of the FET2, and a turn ratio Nr is a ratio (Np1/Ns1) of the number of turns of the primary winding P1 (Np1) to the number of turns of the secondary winding S1 (Ns1). Further, the input voltage Vin is a voltage generating between terminals of the smoothing capacitor C3.

From the formula (1), it is understood that the output voltage Vout is determined by a time ratio of the time TIME1 to the time TIME2 and the input voltage Vin except for the turn ratio Nr which is a fixed value. Accordingly, in order to control the output voltage Vout to a certain value, in the case where the input voltage Vin does not fluctuate, the time ratio of the time TIME1 to the time TIME2 may only be controlled by changing the time TIME1 or the time TIME2 or both of the time TIME1 and the time TIME2. Further, in the case where the input voltage Vin fluctuates, the time TIME1 may only be required to be changed by a ratio inversely proportional to a fluctuation ratio at which the input voltage Vin fluctuate.

Further, from the formula (1), it is understood that if the input voltage Vin does not fluctuate, even when the switching frequency is increased or decreased by changing both of the time TIME1 and the time TIME2, the output voltage Vout does not fluctuate if the time ratio of the time TIME1 to the time TIME2 is not changed. From the above, in order to effect control of maintaining the output voltage Vout at the target voltage, it is possible to select a convenient switching frequency. However, for the following reason, in order to suppress the electric power consumption of the switching power source circuit 100 to the possible extent, there is a need to control also the switching frequency.

[Control of Switching Frequency]

Figure 3A:
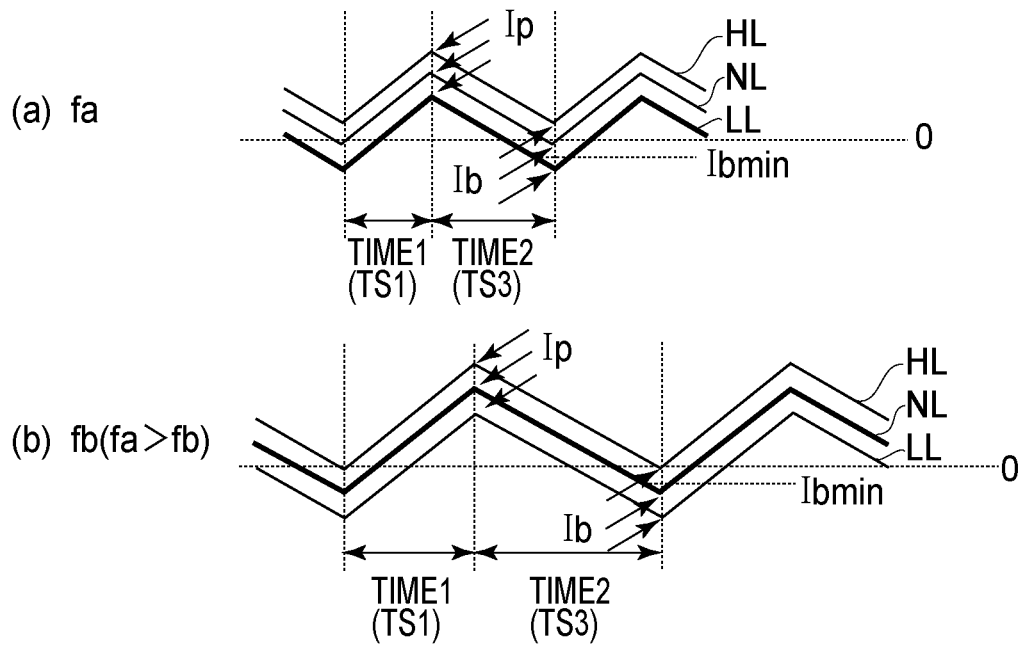
FIGS. 3A and 3B are diagrams for illustrating a difference in current flowing through an excitation inductance for each of loads in Embodiments 1 to 3.

In FIG. 3A, (a) and (b) are diagrams each showing the current waveform of the exciting current flowing through the excitation inductance Ls of the T1 for each of respective loads when the input voltage Vin and the time ratio of the time TIME1 to the time TIME2 are constant. In FIG. 3A, (a) shows the current waveform flowing through the excitation inductance Ls when the switching frequency is fa, and (b) shows the current waveform flowing through the excitation inductance Ls when the switching frequency is fb, in which the abscissa is the time, and the ordinate is the current value. Incidentally, a magnitude relationship between the switching frequencies fa, fb is fa>fb. In the current waveforms shown in each of (a) and (b) of FIG. 3A are those of currents flowing through the excitation inductance Ls in three load states consisting of a heavy load state, a normal load state and a light load state. Further, in each current waveform shown in each of (a) and (b) of FIG. 3A, in the time TIME1, i.e., in the period in which the FET1 in the above-described period TS1 is in the on state, the current flowing through the excitation inductance Ls of the transformer T1 increases. On the other hand, in the time TIME2, i.e., the period in which the FET2 in the above-described TS3 is in the on state, the current flowing through the excitation inductance Ls decreases.

In FIG. 3A, a maximum of the exciting current flowing through the excitation inductance Ls is referred to as a peak current value Ip and a minimum of the excitation inductance is referred to as a bottom current value Ib. The bottom current is energy accumulated in the excitation inductance Ls in the above-described period TS3, and this energy is used for discharging the electric changes in the capacitor C1 for the voltage resonance in the period TS4. Accordingly, in the bottom current value Ib, a minimum required current value Ibmin (negative value) for discharging the electric charges of the capacitor C1 for the voltage resonance exists. When the bottom current value Ib exceeds the current value Ibmin, the zero voltage switching of the FET1 cannot be carried out, so that the electric power consumption at the switching power source circuit 100 becomes large.

For example, in the case of (a) of FIG. 3A, when the load is the light load (thick solid line "LL"), a magnitude relationship between the bottom current value Ib and the current value Ibmin is Ib<Ibmin, and therefore the FET1 can effect the zero voltage switching. However, when the switching frequency is fa and the load is the normal load ("NL") or the heavy load ("HL"), the magnitude relationship between the bottom current value Ib and the current value Ibmin is Ib>Ibmin, and therefore the FET1 cannot effect the zero voltage switching. In this case, control is effected so as to lower the switching frequency so that the magnitude relationship between the bottom current value Ib and the current value Ibmin is Ib<Ibmin. For example, when the load is the normal load, the switching frequency is lowered from fa ((a) of FIG. 3A) to Fb ((b) of FIG. 3A). As a result, as shown in (b) of FIG. 3A, the magnitude relationship between the bottom current value Ib and the current value Ibmin when the load is the normal load (thick solid line, "NL") is Ib<Ibmin, so that the FET1 can effect the zero voltage switching. On the other hand, when the switching frequency is lowered from fa to fb in the case where the load is the light load, as shown in (b) of FIG. 3A, the bottom current value Ib is largely below the current value Ibmin. As a result, the energy accumulated in the excitation inductance Ls is returned to the smoothing capacitor C3 without being transmitted to the secondary side of the transformer T1, so that the electric power consumption at the switching power source circuit 100 becomes large.

Accordingly, in order to improve the electric power conversion efficiency while maintaining the zero voltage switching of the FET1, the switching frequency may only be required to be controlled by changing the times TIME1, TIME2 so that the bottom current value Ib is a proper current value satisfying Ib<Ibmin. As described above, in order to effect the zero voltage switching of the FET1, the bottom current value Ib of the exciting current may also be detected as it is. In this embodiment, in place of the bottom current value Ib, the zero voltage switching of the FET1 is effected using an average value of the current flowing through the FET1 detected by the current detecting portion 119. This is because not only an erroneous operation risk due to the noise generating during the turning-off of the FETs 1, 2 is reduced but also detection accuracy of the current is ensured.

[Bottom Current Value and Average Current Value of FET1]

Figure 3B:
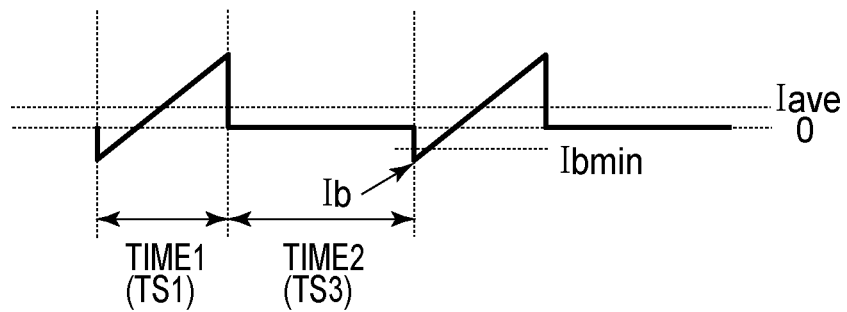

FIG. 3B is a diagram showing a waveform of the current flowing through the FET1 and an average value of the current, in which the abscissa is a time, and the ordinate is a current value. In FIG. 3B, in the time TIME1 in which the FET1 is in the on state (in the period TS1), the current flowing through the FET1 increases with a lapse of the time. On the other hand, in the time TIME2 in which the FET1 is in the off state (in the period TS3), the FET1 is turned off, and therefore the current does not flow. When the average value of the current flowing through the FET1 is Iave, the average current is represented by the following formula (2).

$$I_{ave} = \left(\frac{N_r \cdot V_{out}}{2Ls} \cdot \text{TIME2} + I_b\right) \cdot \frac{1}{1 + \frac{\text{TIME2}}{\text{TIME1}}} \quad (2)$$

From the formula (2), when the average current value Iave in the case where the bottom current value Ib is the current value Ibmin (Ib=Ibmin) is Iavelimit, the average current value Iavelimit which is a first threshold is represented by the following formula (3).

$$I_{avelimit} = \left(\frac{N_r \cdot V_{out}}{2ls} \cdot \text{TIME2} + I_{bmin}\right) \cdot \frac{1}{1 + \frac{\text{TIME2}}{\text{TIME1}}} \quad (3)$$

Accordingly, in order that the bottom current value Ib satisfies the relationship of Ib<Ibmin, it is understood that the times TIME1, TIME2 are controlled so that the average current value Iave satisfies the relationship of Iave<Iavelimit.

Further, as described above, in the case where the input voltage Vin fluctuates, in order to maintain the current voltage Vout at the constant voltage, the time TIME1 is changed by a ratio inversely proportional to the fluctuation ratio of the input voltage Vin. With this change, also Iave and Iavelimit which are the average current values fluctuate, but Iave and Iavelimit fluctuate at the same ratio, and therefore the magnitude relationship of Iave<Iavelimit remain unchanged. Accordingly, it is understood that the times TIME1, TIME2 may only be required to be controlled so that the magnitude relationship between the average current values Iave and Iavelimit satisfies Iave<Iavelimit.

[Control of Times TIME1, TIME2]

Next, as a feature of this embodiment, a method of controlling the time TIME1 and the time TIME2 so that the average current values Iave, Iavelimit satisfy Iave<Iavelimit will be described using FIG. 4. First, a graph showing a relationship between the time TIME2 and the average current value Iavelimit is (a) of FIG. 4. In (a) of FIG. 4, the abscissa is a time of the time TIME2, and the ordinate is a current value of the average current value Iave. Here, the output voltage Vout is controlled at the constant voltage, and therefore the time ratio between the times TIME1, TIME2 is substantially fixed. For that reason, in a region defined by Iavelimit and the abscissa of (a) of FIG. 4, the magnitude relationship between the average current values Iave, Iavelimit satisfies Iave<Iavelimit.

Here, compared with a period of the control for making the output voltage Vout constant, a period of control for satisfying the average current value relationship of Iave<Iavelimit should be sufficiently long. This is because two control loops, i.e., a control loop for controlling the current voltage Vout and a control loop for controlling the average current value exist and unstability of control for making the output voltage Vout constant is avoided. Further, a frequent fluctuation in switching frequency should be avoided since the fluctuation leads to an unstable factor.

In this embodiment, the control for satisfying the average current value relationship of Iave<Iavelimit is stepwisely effected with a resolution lower than that of control for making the output voltage Vout constant. In FIG. 4, (b) is a graph for illustrating this control, i.e., the control of the time TIME2 by the average current value Iave. In (b) of FIG. 4, the abscissa is the time of the time TIME2, and the ordinate is the current value of the average current value Vave. As shown in (b) of FIG. 4, as regard the average current value Vave, two thresholds Iavecomp1, Iavecomp2 which are second thresholds are provided. In the case where the average current value Iave is Iave<Iavecomp1, TIME2_2 is set as the TIME2 which is the on-time of the FET2. Similarly, in the case where the average current value Iave is Iavecomp1<Iave<Iavecomp2, TIME2_b is set as the TIME2, and in the case where the average current value Iave is Iavecomp2≤TIME_c is set as the TIME2. Here, the threshold Iavecomp1 is a value smaller than the average current value Iavelimit, when the TIME2 is the TIME2_a, by Iavemargin_24 V which is a predetermined margin. Similarly, the threshold Iavecomp2 is a value smaller than the average current value Iavelimit, when the TIME2 is the TIME2_b, by Iavemargin_24 V which is the predetermined margin. Further, by appropriately selecting the thresholds Iavecomp1, Iavecomp2 and the set values TIME2_a, TIME2_b, TIME2_c of the time TIME2, even in the case where a large load fluctuation generates, the switching frequency of the FET2 does not change frequently. As a result, the switching power source circuit 100 can stably operate.

Further, in this embodiment, every target voltage (24 V or 5 V) of the output voltage Vout, the number and values of the thresholds are changed. The above-described (b) of FIG. 4 is a graph for illustrating the control in the case where the target voltage is 24 V, and on the other hand, (c) of FIG. 4 is a graph for illustrating control of the time TIME2 by the average current value Iave in the case where the target voltage is 5 V. In (c) of FIG. 4, the abscissa is the time of the time TIME2, and the ordinate is the current value of the average current value Iave. In (c) of FIG. 6, 6 thresholds Iavecomp1 to Iavecomp6 are provided. Here, for convenience of explanation, the thresholds Iavecomp1 and Iavecomp2 are also used in (b) of FIG. 4, but are different in value from those in (b) of FIG. 4. Incidentally, also in the figures appearing hereinafter, the same threshold names are used in the cases where the target voltage is 24 V and is 5 V, but are different in threshold from each other.

In the case where the average current value Iave is Iave<Iavecomp1, TIME2_2 is set as the time TIME2 which is the on-time of the FET2. Similarly, in the case where the average current value Iave is Iavecomp1≤Iave<Iavecomp2 and in the case where the average current value Iave is Iavecomp2≤Iave<Iavecomp3, as the time TIME2, TIME2_b and TIME2_c are set, respectively. Further, in the case where the average current value Iave is Iavecomp3≤Iave<Iavecomp4 and in the case where the average current value Iave is Iavecomp4≤Iave<Iavecomp5, as the time TIME2, TIME2_d and TIME2_e are set, respectively. Similarly, in the case where the average current value Iave is Iavecomp5≤Iave<Iavecomp6 and in the case where the average current value Iave is Iavecomp6≤Iave, as the time TIME2, TIME2_f and TIME2_g are set, respectively. Here, the threshold Iavecomp5 is a value smaller than the Iavelimit, when the time TIME2 is TIME_e, by Iavemargin_5 V which is a predetermined margin, and this is true for other thresholds.

Figure 4:
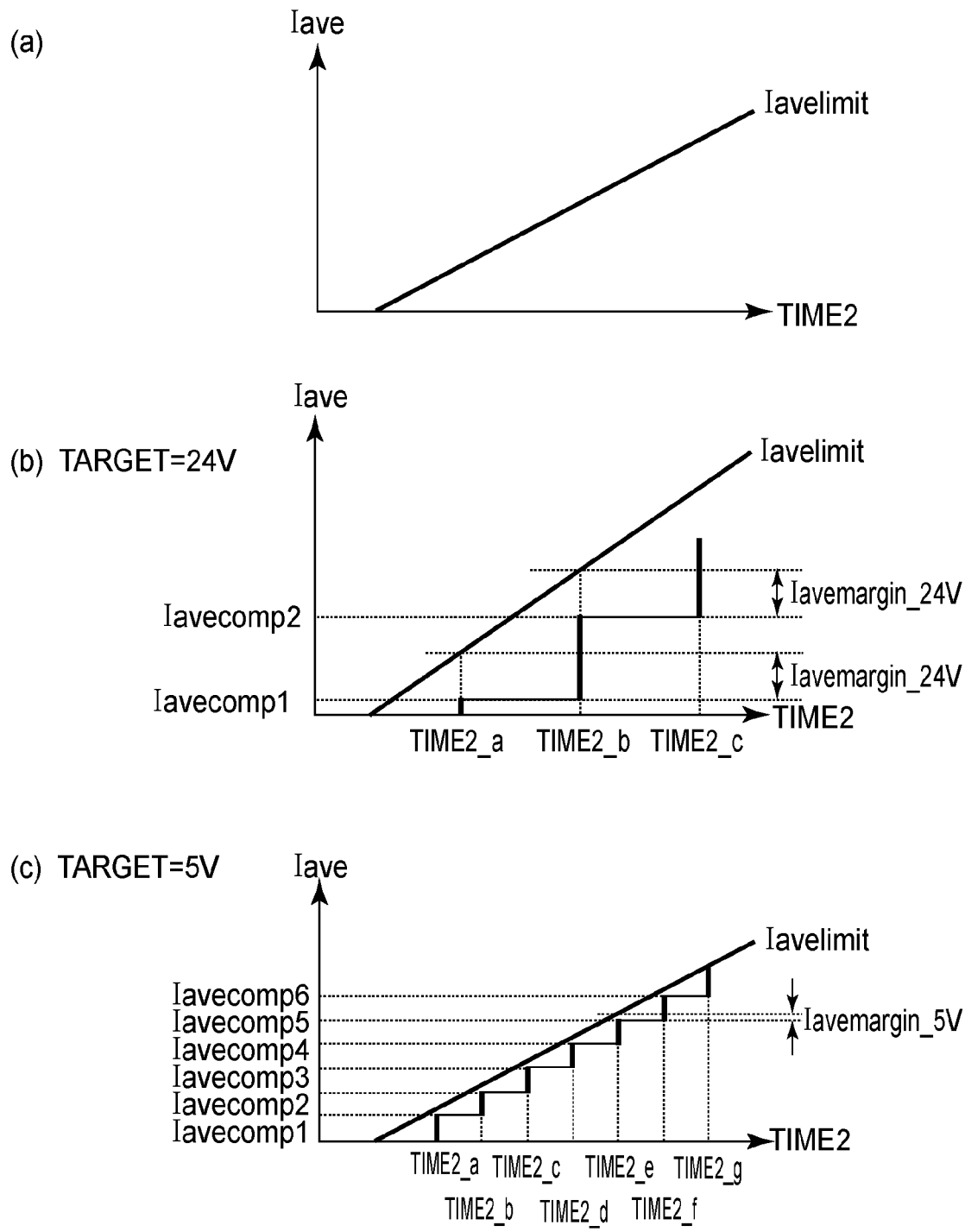
In FIG. 4, (a) to (c) are graphs for illustrating control of a time TIME2 by an average current value in Embodiments 1 and 2.

In the case where the target voltage in (c) of FIG. 4 is 5 V, compared with the case of 24 V in (b) of FIG. 4, a dissolution of control for satisfying Iave<Iavelimit by Iave is set finely, i.e., the number of transformers is set at a large value. Further, the thresholds (Iavecomp1 and the like) of the average current value Iave are set so that the average current value Iave is controlled at value close to Iavelimit when the target voltage is 5 V. As a result, when predetermined amounts in the cases where the target voltages are 24 V and 5 V are compared with each other, Iavemargin 24 V (amount of the predetermined margin in the case of 24 V)>Iavemargin_5 V (amount of the predetermined margin in the case of 5 V) is satisfied. This is because when the target voltage is 5 V, the switching power source circuit 100 is in a sleep (Sleep) state and therefore a required electric power conversion efficiency is high when compared with the case where the target voltage is 24 V at which the switching power source circuit 100 is in a ready (Ready) state. For that reason, the average current value Iave is controlled at a value in the neighborhood of Iavelimit, whereby useless electric power loss is decreased. In addition, when the target voltage is 5 V, a load fluctuation is small compared with when the target voltage is 24 V, and therefore even when the dissolution of the control is made fine and the average current value Iave is controlled in a state close to Iavelimit, stable control is readily effected.

[Control of Current Voltage]

In this embodiment, the digital controller 101 includes, in an unshown ROM, a table constituted by a voltage inputted into the FB terminal (hereinafter referred to as a FB terminal voltage ("VFB") and the times TIME1, TIME2 with respect to the FB terminal voltage. Further, the digital controller 101 effects control of FET1, FET2 on the basis of this table.

Figure 5:
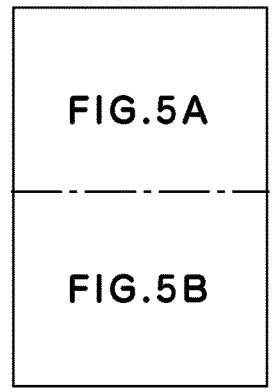
FIGS. 5A and 5B are tables showing a correspondence among an FB terminal voltage and on-times of switches in Embodiment 1.

FIG. 5 is a table showing an example of a table of the times TIME1, TIME2 corresponding to the FB terminal voltage of the switching power source circuit 100. In FIG. 5, 3 tables, i.e., Table A, Table B, Table C which are used in the cases where the average current value Iave satisfies Iave<Iavecomp1, Iavecomp1≤Iave<Iavecomp2, Iavecomp2≤Iave, respectively. Items of the respective tables are constituted by the FB terminal voltage, the time TIME1, the time TIME2 and the time ratio (TIME1/TIME2), and with respect to the respective FB terminal voltages, corresponding values of the times TIME1, the times TIME2 and the time ratios each obtained by dividing the time TIME1 by the time TIME2 are set. The FB terminal and an IS terminal of the digital controller 101 are connected with an internal AD converter (not shown), and a voltage (analog value) inputted into each of the FB terminal and the IS terminal is subjected to AD conversion by the AD converter, and thus is converted into a digital value. In this embodiment, the FB terminal voltages shown in the tables of FIG. 5 are 6-bit digital values and are expressed by decimal numbers (dec) of 0 to 63.

Figure 6:
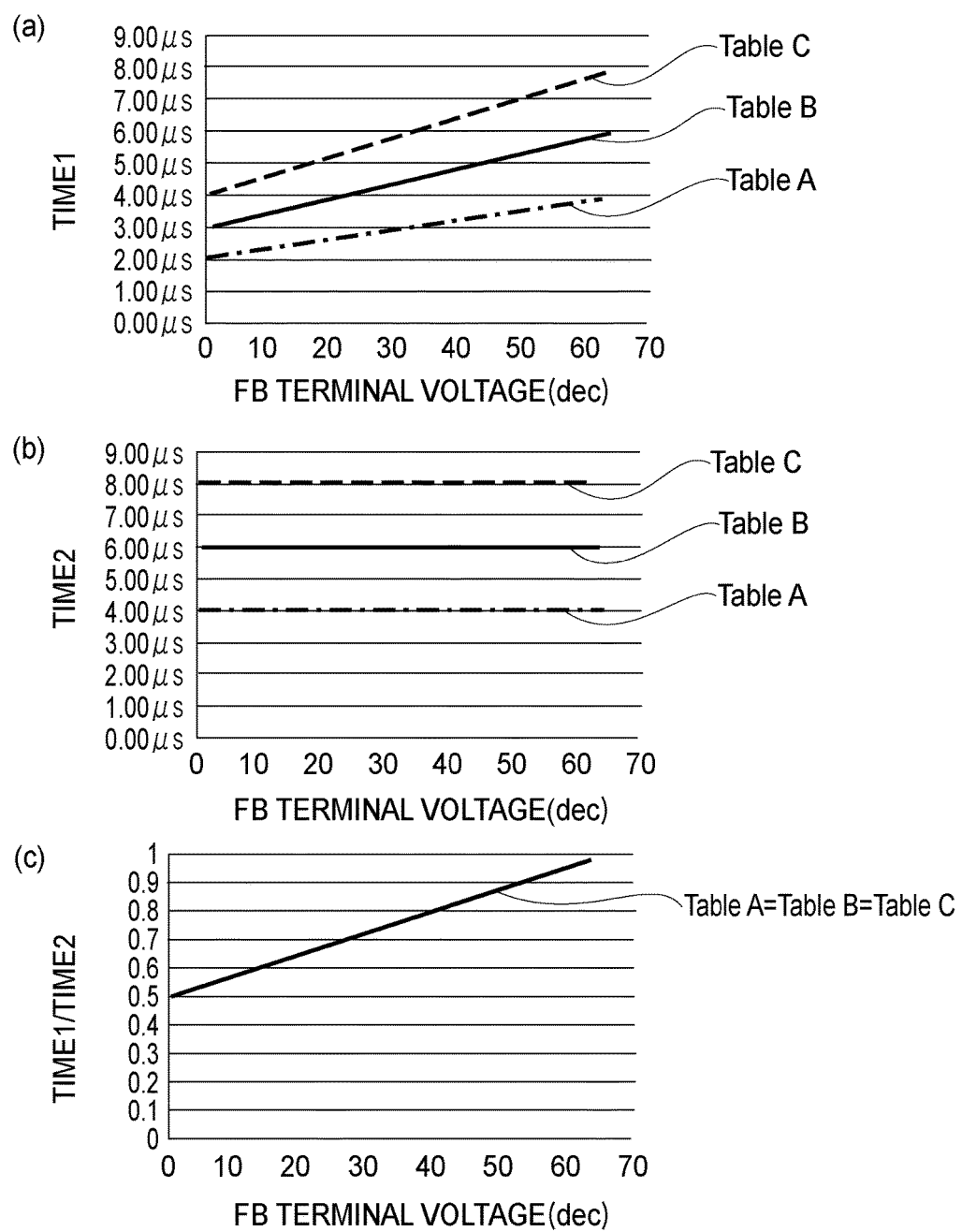
In FIG. 6, (a) to (c) are graphs each showing a correspondence between the FB terminal voltage and an associated on-time of the switch in Embodiment 1.

In FIG. 6, (a) to (c) are graphs showing the contents of the respective tables shown in FIG. 5. In FIG. 6, (a) is a graph showing a relationship between the FB terminal voltage and the time TIME1 in each table of FIG. 5, (b) is a graph showing a relationship between the feed-back terminal voltage and the time TIME2 in each table of FIG. 5, and (c) is a graph showing a relationship between the feed-back terminal voltage and the time ratio (TIME1/TIME2) in each table of FIG. 5. In (a) to (c) of FIG. 6, the table A (Table A) is indicated by a chain line, the table B (Table B) is indicated by a solid line, and the table C (Table C) is indicated by a broken line. In (a) of FIG. 6, each of the tables shows that the time TIME1 increases with an increasing FB terminal voltage. In (b) of FIG. 6, the respective tables are different in value of the time TIME2, but shows fixed values with respect to the FB terminal voltage. Further, in (c) of FIG. 6, the respective tables show the same relationship between the FB terminal voltage and the time ratio (TIME1/TIME2), i.e., show the same time ratio relative to the same FB terminal voltage.

As shown in the respective tables in FIG. 5, the times TIME1 increase with an increasing FB terminal voltage. Further, the times TIME2 are fixed values (4 μs in Table A, 6 μs in Table B, 8 μs in Table C), and therefore also the time ratio (TIME1/TIME2) of the time TIME1 to the time TIME2 increases simultaneously with an increase in FB terminal voltage. In the respective tables in FIG. 5, values of the times TIME2 which are the fixed values are different among the respective tables. With this difference, also the values of the times TIME1 relative to the feed-back terminal voltages are different from each other, but the time ratios (TIME1/TIME2) of the times TIME1 to the times TIME2 relative to the feed-back terminal voltages are the same values among the respective tables. As a result, even in the case where the table used is changed depending on the average current value Iave, when there is no fluctuation in input Vin and the time ratios (TIME1/TIME2) are the same, from the above-described formula (1), the output voltage Vout substantially remain unchanged. For that reason, it is possible to maintain stability of control of the output voltage Vout. Incidentally, against the fluctuation in input voltage Vin, as described above, the time TIME1 may only be required to be changed by the ratio inversely proportional to the fluctuation ratio of the input voltage Vin.

In FIGS. 5 and 6, an example of the table in the case where the two thresholds Iavecomp1 and Iavecomp2 were used was described. In the case where the number of the thresholds is larger as shown in (c) of FIG. 4, tables may be prepared depending on the associated number of the thresholds. At that time, as the above-described tables in FIG. 5, the tables may only be required to be prepared so that the times TIME2 in the respective tables are made fixed values, and the time ratios (TIME1/TIME2) are made the same although the times TIME1 relative to the FB terminal voltages are different from each other in each of the tables.

[Control Sequence of Output Voltage]

Figure 7:
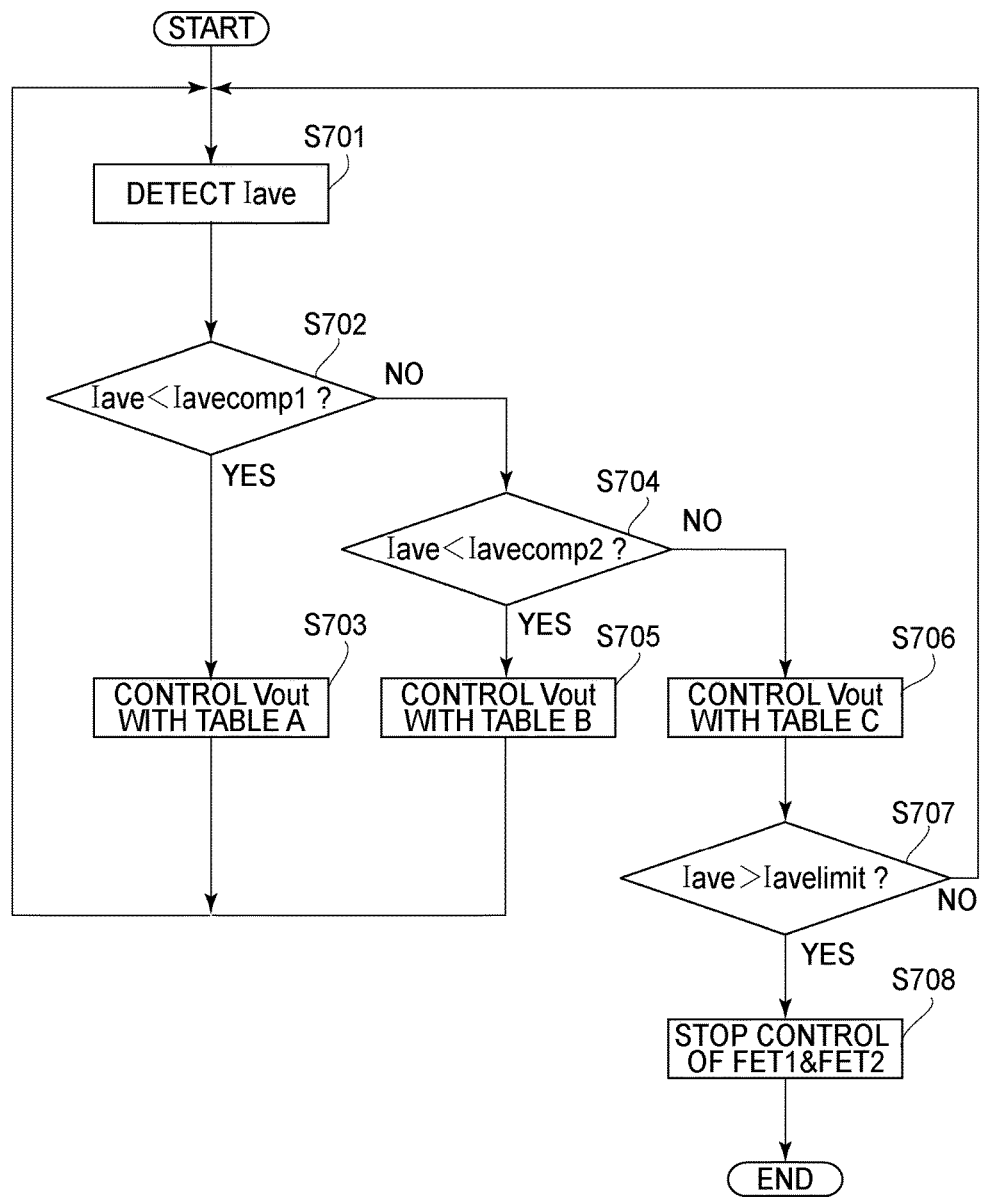
FIG. 7 is a flowchart showing a control sequence of the time TIME2 by the average current value in Embodiments 1 and 2.

Finally, a flow of control of the above-described output voltage Vout will be described using FIG. 7. FIG. 7 is a flowchart showing a control sequence of the output voltage Vout, and when the switching power source circuit 100 is operated, the digital controller 101 is actuated and carries out the control sequence. Incidentally, the values of the thresholds Iavecomp1, Iavecomp2 are stored in the above-described ROM in advance.

In S (step) S701, the digital controller 101 decreases the average value Iave of the current, flowing through the FET1, which is detected by the current detecting portion and which is inputted into the IS terminal. In S702, the digital controller 101 discriminates whether or not the detected average current value Iave is smaller than the threshold Iavecomp1 (Iave<Iavecomp1). In the case where the digital controller 101 discriminated that the average current value Iave is smaller than the threshold Iavecomp1, the digital controller 101 causes the process to go to S703. In the case where the digital controller 101 discriminated that the average current value Iave is not smaller than the threshold Iavecomp1 (i.e., the average current value Iave is not less than the threshold Iavecomp1, the digital controller 101 causes the process to go to S704. In S703, the digital controller 101 effect control of the output voltage Vout by using the table A (Table A), and returns the process to S701. In S704, the digital controller 101 discriminates whether or not the detected average current value Iave is smaller than the threshold Iavecomp2 (Iave<Iavecomp2). In the case where the digital controller 101 discriminated that the average current value Iave is smaller than the threshold Iavecomp2, the digital controller 101 causes the process to go to S705. In the case where the digital controller 101 discriminated that the average current value Iave is not smaller than the threshold Iavecomp2 (i.e., the average current value Iave is not less than the threshold Iavecomp2, the digital controller 101 causes the process to go to S706. In S705, the digital controller 101 effect control of the output voltage Vout by using the table B (Table B), and returns the process to S701.

In S706, the digital controller 101 effects the control of the output voltage Vout by using the table C (Table C), and causes the process to go to S707. In S707, the digital controller 101 discriminates whether or not the detected average current value Iave is larger than the current value Iavelimit (Iave>Iavelimit) in a state in which the control of the output voltage Vout is effected by executing the process of S706. The digital controller 101 calculates the current value Iavelimit by using the above-described formula (3). In the formula (3), the turn ratio Nr and the bottom current value Ibmin are used and are stored in the above-described ROM in advance. In the case where the digital controller 101 discriminated that the average current value Iave is larger than the current value Iavelimit, the digital controller 101 causes the process to go to S708. In the case where the digital controller 101 discriminated that the average current value Iave is not larger than the current value Iavelimit (i.e., the average current value Iave is not more than the current value Iavelimit, the digital controller 101 returns the process to go to S701. In S708, the digital controller 101 discriminated that an abnormal state in which a part of the switching power source circuit 100 does not properly operate is formed, and stops the control of the FET1 and the FET2 in order to protect the circuit.

Incidentally, in this embodiment, the control sequence in which the control of the output voltage Vout is effected by selectively using the three tables with the two thresholds was described. For example, as shown in (c) of FIG. 4, even when the number of the thresholds increases and correspondingly, the number of the tables increases, a similar process can be carried out by increasing the number of branches of the discrimination of the average current value Iave in the flowchart of FIG. 7.

As described above, control of changing the switching frequencies of the FET1 and the FET2 depending on the average current value of the current flowing through the FET1 is effected, and, a control value for changing the switching frequency is changed by the target voltage of the output voltage Vout. As a result, it is possible to realize the switching power source capable of flexibly meeting required specifications for each of the target voltages while achieving the zero voltage switching even in any load with an expensive constitution.

As described above, according to this embodiment, with a simple constitution, the zero voltage switching can be carried out efficiently.

[Embodiment 2]

In Embodiment 1, the embodiment in which the control of the output voltage Vout is effected by variably changing only the time TIME1, in which the FET1 is turned on, depending on the FB terminal voltage was described. In Embodiment 2, an embodiment in which the control of the output voltage Vout is effected by changing both of the time TIME1 in which the FET1 is turned on and the time TIME2 in which the FET2 is turned on, depending on the FB terminal voltage will be described.

Embodiment 2 is different from Embodiment 1 in that also the time TIME2 is changed together with the time TIME1. Incidentally, the power source device used in this embodiment is similar to that in Embodiment 1, and in the following, constituent elements similar to those in Embodiment 1 are represented by the same reference numerals or symbols and will be omitted from description. Further, as regards the thresholds (Iavecomp1 and the like) described later when the table is switched, the threshold used in Embodiment 1 will be used.

[Control Method of Output Voltage]

In this embodiment, the digital controller 101 effects the control of the output voltage Vout in the following manner. First, the digital controller 101 effects the following control in the case where the output voltage Vout is lower than the target voltage. That is, the digital controller 101 also increases the time ratio (TIME1/TIME2) of the time TIME1 to the time TIME2 while increasing both the time TIME1 which is the on-time of the FET1 and the time TIME2 which is the on-time of the FET2. On the other hand, the digital controller 101 effect control opposite from the above-described control in the case where the output voltage Vout is higher than the target voltage. That is, the digital controller 101 also decreases the time ratio (TIME1/TIME2) of the time TIME1 to the time TIME2 while decreasing both the time TIME1 which is the on-time of the FET1 and the time TIME2 which is the on-time of the FET2. As a result, the digital controller 101 controls the output voltage Vout so as to maintain the output voltage 101 at a certain voltage.

Here, the reason why both of the time TIME1 and the time TIME2 are changed will be described. In the case of the control method of changing only the time TIME1 relative to the feed-back terminal voltage described in Embodiment 1, a change rate of the time ratio (TIME1/TIME2) with respect to the FB terminal voltage is large, and therefore a change rate of the output voltage Vout becomes large. For example, in the table A (Table A) of FIG. 5 in Embodiment 1, the time ratio (TIME1/TIME2) when the FB terminal voltage is 1 is 0.5075, and the time ratio (TIME1/TIME2) when the FB terminal voltage is 63 is 0.9725. In this case, the change rate of the time ratio (TIME1/TIME2) is about 1.9 times (=0.9725/0.5075). Incidentally, the time ratio (TIME1/TIME2) is the same value also in other tables, and therefore the change rates of the time ratio (TIME1/TIME2) in other tables are similarly the same value. For that reason, when the element used as the digital controller 101 is selected, there is a need to select a high-performance element capable of outputting on-widths of the driving signals DRV1, DRV2 corresponding to the on-times of the FET1, FET2 with a high resolution, so that there is a liability that a cost increases.

Therefore, in this embodiment, the above-described control is effected in order to select an inexpensive digital controller with a small on-width resolution while suppressing the increase in cost. That is, the digital controller 101 changes both of the times TIME1, TIME2 with respect to the change in FB terminal voltage, so that the change rate of the time ratio (TIME1/TIME2) with respect to the change in FB terminal voltage is made small. As a result, the change rate of the output voltage Vout can be made small, and the inexpensive digital controller can be selected.

[Control of Output Voltage]

Figure 8:
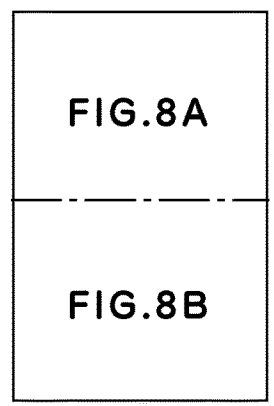
FIGS. 8A and 8B are tables showing a correspondence among an FB terminal voltage and on-times of switches in Embodiment 2.

Details of the control of the times TIME1, TIME2 by the digital controller 101 will be described using FIG. 8. FIG. 8 is a table showing an example of a table of the times TIME1, TIME2 corresponding to the FB terminal voltage of the switching power source circuit 100. In FIG. 5, 3 tables, i.e., Table A, Table B, Table C which are used in the cases where the average current value Iave satisfies Iave<Iavecomp1, Iavecomp1≤Iave<Iavecomp2, Iavecomp2≤Iave, respectively.

Incidentally, constitutions of the respective tables of FIG. 8 are similar to those of FIG. 5, and therefore will be omitted from description in this embodiment.

Figure 9:
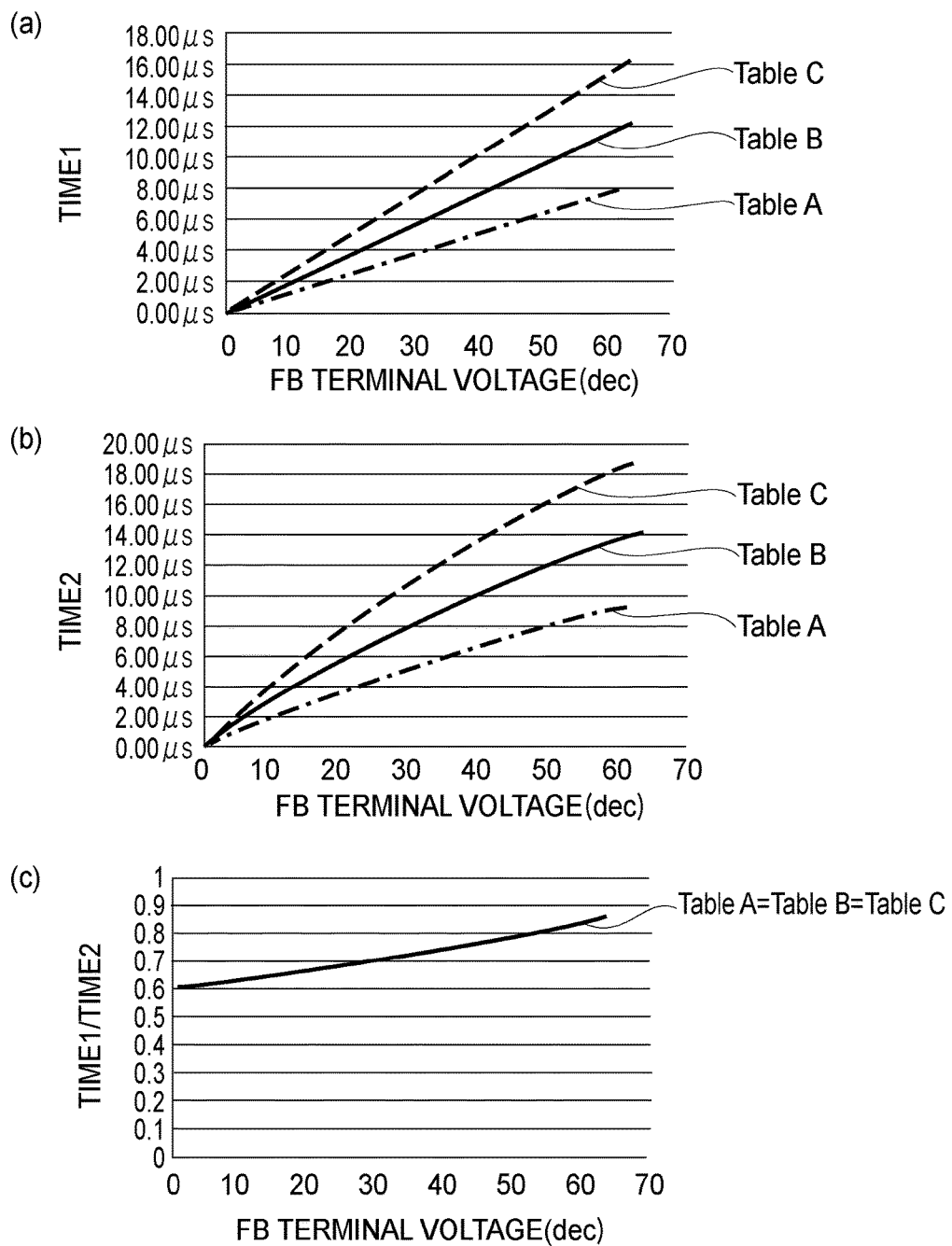
In FIG. 9, (a) to (c) are graphs each showing a correspondence between the FB terminal voltage and an associated on-time of the switch in Embodiment 2.

In FIG. 9, (a) to (c) are graphs showing the contents of the respective tables shown in FIG. 8. In FIG. 9, (a) is a graph showing a relationship between the FB terminal voltage and the time TIME1 in each table of FIG. 8, (b) is a graph showing a relationship between the feed-back terminal voltage and the time TIME2 in each table of FIG. 8, and (c) is a graph showing a relationship between the feed-back terminal voltage and the time ratio (TIME1/TIME2) in each table of FIG. 8. In (a) to (c) of FIG. 9, the table A (Table A) is indicated by a chain line, the table B (Table B) is indicated by a solid line, and the table C (Table C) is indicated by a broken line. In (a) of FIG. 6, each of the tables shows that the time TIME1 increases with an increasing FB terminal voltage. For example, as regards the table A (Table A), with respect to the FB terminal voltages 1 to 63, the time TIME1 changes in a range of 0.13 μs to 8.08 μs. Also in (b) of FIG. 9, in each of the tables, the time TIME2 increases with an increasing FB terminal voltage. For example, as regards the table A (Table A), with respect to the FB terminal voltages 1 to 63, the time TIME2 changes in a range of 0.21 μs to 9.42 μs.

In this embodiment, depending on the FB terminal voltage, the time TIME1 in which the FET1 is turned on and the time TIME2 in which the FET2 is turned on change, so that the switching frequency of the FET1 and the switching frequency of the FET2 are different from each other. However, (c) of FIG. 9 shows that the time ratios (TIME1/TIME2) with respect to the FB terminal voltage in the respective tables are the same. As a result, similarly as in Embodiment 1, even in the case where the table used is changed depending on the average current value Iave, when there is no fluctuation in input Vin and the time ratios (TIME1/TIME2) are the same, from the above-described formula (1), the output voltage Vout substantially remain unchanged. For that reason, it is possible to maintain stability of control of the output voltage Vout. Incidentally, against the fluctuation in input voltage Vin, as described above, the time TIME1 may only be required to be changed by the ratio inversely proportional to the fluctuation ratio of the input voltage Vin.

In each of the tables, with respect to the FB terminal voltages 1 to 63, the time ratio (TIME1/TIME2) changes in a range of about 0.6063 to about 0.8577. The change rate of the time ratio (TIME1/TIME2) with respect to the FB terminal voltage is about 1.4 times (=0.8577/0.6063). As described above, in the case of Embodiment 1, the change rate of the time ratio (TIME1/TIME2) with respect to the FB terminal voltage is about 1.9 times, so that it is understood that the change rate is reduced in this embodiment by about 26% (=(1-(1.4/1.9)×100).

In FIGS. 8 and 9, an example of the table in the case where the two thresholds Iavecomp1 and Iavecomp2 were used was described. In the case where the number of the thresholds is larger, tables may be prepared depending on the associated number of the thresholds. At that time, as the above-described tables in FIG. 8, in each of the tables, depending on the FB terminal voltage, both of the times TIME1, TIME2 are changed. Further, the times TIME1, TIME2 may only be required to be set so that compared with the case of Embodiment 1 in which the time TIME2 is the fixed value, the change rate of the time ratio (TIME1/TIME2) with respect to the change in FB terminal voltage becomes small.

As described above, in this embodiment, depending on the average current value Iave flowing through the FET1, the control of changing the switching frequency of the FET1 and the FET2 is effected, and depending on the FB terminal voltage, both of the times TIME1, TIME2 are changed. As a result, the change rate of the output voltage Vout with respect to the change in FB terminal voltage can be made small, and it is possible to use the inexpensive digital controller 101 with the small dissolution of the on-width of the output signal.

As described above, according to this embodiment, with a simple constitution, the zero voltage switching can be carried out with efficiency.

(Embodiment 3)

In Embodiment 1, the embodiment in which the control of the output voltage Vout is effected by changing only the time TIME1, in which the FET1 is turned on, depending on the FB terminal voltage was described. In Embodiment 3, an embodiment in which the control of the time TIME1 in which the FET1 is turned on depending on the operation state of the power source device will be described. Incidentally, the power source device used in this embodiment is similar to that in Embodiment 1, and in the following description, constituent elements similar to those in Embodiment 1 are represented by the same reference numerals or symbols and will be omitted from description.

[Control of Times TIME1, TIME2]

Figure 10:
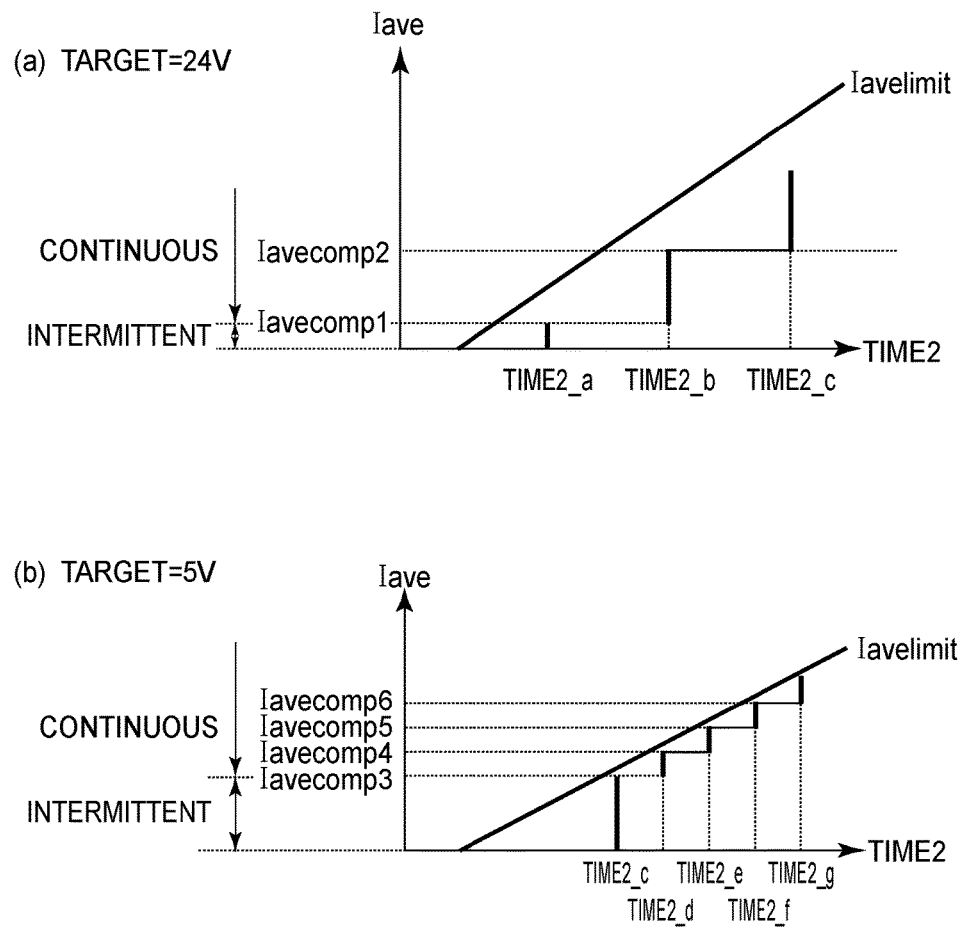
FIG. 10, (a) and (b) are graphs for illustrating control of a time TIME2 by an average current value Iave in Embodiment 3.

In FIG. 10, (a) and (b) are graphs each for illustrating a method of controlling the time TIME2 so that the average current value Iave satisfies Iave<Iavelimit. In FIG. 10, (a) is the graph for illustrating control when the target voltage is 24 V, and (b) is the graph for illustrating the when the target voltage is 5 V. In (a) and (b) of FIG. 10, the abscissa is the time of the time TIME2, and the ordinate is the current value of the average current value Iave. Also in this embodiment, similarly as in Embodiment 1, the control for satisfying the average current value relationship of Iave<Iavelimit is stepwisely effected with a resolution lower than that of control for making the output voltage Vout constant.

Further, similarly as in Embodiment 1, in the case where the target voltage in (c) of FIG. 4 is 5 V, compared with the case of 24 V, a dissolution of control for satisfying Iave<Iavelimit by Iave is set finely. Further, the thresholds (Iavecomp1 and the like) of the average current value Iave are set so that the average current value Iave is controlled at value close to Iavelimit when the target voltage is 5 V compared with the case of the target voltage of 24 V.

In addition, in this embodiment, depending on the operation state of the switching power source circuit 100, control of the on-time of the FET1 is effected. In this embodiment, the switching power source circuit 100 is operable in two operation states, i.e., an intermittent operation state and a continuous operation state. In the intermittent operation state, control in which a switching state in which the FET1 and the FET2 are alternately turned on and off (i.e., the above-described state in which the periods TS1 to TS4 are repeated) and a rest state in which the FET1 and the FET2 are kept in the off state. On the other hand, in the continuous operation state, control in which the FET1 and the FET2 are continuously turned on and off alternately is effected.

Next, control of the digital controller 101 depending on the two operation states will be described using FIG. 10. In FIG. 10, (a) is the graph for illustrating the control when the target voltage is 24 V, in which the thresholds Iavecomp1, Iavecomp2 of the average current value Iave and the times TIME1_a, TIME2_b, TIME2_c are similar to those in (b) of FIG. 4 in Embodiment 1, and will be omitted from description. In (a) of FIG. 10, in the case where the average current value Iave satisfies Iave<Iavecomp1, the switching power source circuit 100 is in the intermittent operation state, and TIME_a is set as the TIME2 which is the on-time of the FET2. Next, when the average current value Iave becomes Iavecomp1<Iave, the switching power source circuit 100 is in the continuous operation state. Then, in the case where the average current value Iave satisfies Iavecomp1≤Iave ≤Iavecomp2, TIME2_b is set as the time TIME2, and in the case where the average current value Iave satisfies Iavecomp2≤Iave, TIME2_c is set as the time TIME2.

In FIG. 10, (b) is the graph for illustrating the control when the target voltage is 5 V, in which the thresholds Iavecomp3 to Iavecomp6 of the average current value Iave and the times TIME1_c to TIME2_g are similar to those in (c) of FIG. 4 in Embodiment 1, and will be omitted from description. In the case where the average current value Iave satisfies Iave<Iavecomp3, the switching power source circuit 100 is in the intermittent operation state, and TIME_c is set as the TIME2 which is the on-time of the FET2. Next, when the average current value Iave becomes Iavecomp3≤Iave, the switching power source circuit 100 is in the continuous operation state. Then, in the case where the average current value Iave satisfies Iavecomp3≤Iave<Iavecomp4 to Iavecomp4≤Iave<Iavecomp5, TIME2_d or TIME2_e is set as the time TIME2, respectively. Further, in the case where the average current value Iave satisfies Iavecomp5≤Iave<Iavecomp6 or Iavecomp6<Iave, TIME2_f or TIME_g is set as the time TIME2, respectively.

In this embodiment, the thresholds Iavecomp1 and the like are changed depending on the target voltage, i.e., 24 V or 5 V. When the switching power source circuit 100 is in the intermittent operation state, compared with the case of the continuous operation state, the electric power conversion efficiency is high, but the voltage fluctuation due to the load fluctuation is large. For that reason, the operation of the switching power source circuit 100 in the intermittent operation state is not suitable for the case where the load fluctuation is large. Accordingly, when the target voltage is 5 V, compared with the case where the target voltage is 24 V, the load fluctuation is small and the required electric power conversion efficiency is high, and therefore the threshold is set so that the switching power source circuit 100 readily enter the intermittent operation state when the target voltage is 5 V more than when the target voltage is 24 V.

[Control of Output Voltage Using Table]

Figure 11:
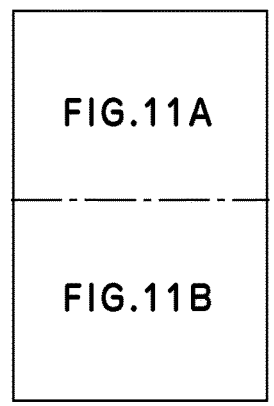
FIGS. 11A and 11B are tables showing a correspondence among an FB terminal voltage and on-times of switches in Embodiment 3.

Details of the control of the times TIME1, TIME2 by the digital controller 101 will be described using FIG. 22. FIG. 11 is a table showing an example of a table of the times TIME1, TIME2 corresponding to the FB terminal voltage of the switching power source circuit 100. In FIG. 11, 3 tables, i.e., Table A, Table B, Table C which are used in the cases where the average current value Iave satisfies Iave<Iavecomp1, Iavecomp1≤Iave<Iavecomp2, Iavecomp2≤Iave, respectively. Incidentally, the constitution of each of the tables in FIG. 11 is similar to that in FIG. 5 in Embodiment 1, and will be omitted from description in this embodiment.

In each of the tables, the time of the TIME2 is a fixed value, i.e., is 4 μs in the table A (Table A), 6 μs in the table B (Table B) and 8 μs in the table C (Table C), and these values are those in the tables shown in FIG. 5 in Embodiment 1. Further, except for the case where values for the FB terminal voltages 1 to 33 in the table A (Table A) shown in FIG. 11, values of the times TIME1, TIME2 and the time ratio (TIME1/TIME2) are the same values as those in FIG. 5 in Embodiment 1. On the other hand, in the case where the FB terminal voltages of the table A (Table A) is 1-33, the time TIME1 is 3 μs, the time TIME2 is 4 μs and the time ratio (TIME1/TIME2) is 0.75, which are the fixed values.

However, as described above, when the average current value Iave is Iave<Iavecomp1 and the FB terminal voltage is not more than a predetermined value (not more than 33), the switching power source circuit 100 is in the intermittent operation state. In order to maintain the intermittent operation state, in view of a voltage lowering in output voltage Vout in a rest state in which the FETs 1, 2 are kept in the off state, there is a need that the output voltages Vout of the FETs 1, 2 in the switching state are made higher than the target voltage. For that reason, there is a need to provide the time ratio (TIME1/TIME2) of the time TIME1 to the time TIME2 such that the output voltage Vout in the above-described formula (1) exceeds the target voltage. Therefore, as regards the FB terminal voltages 1 to 33 in the table A, the time TIME1 is set at 3 μs and thus the time ratio (TIME1/TIME2) is set at 0.75 (=3 μs/4 μs), and then control of increasing the output voltage Vout is carried out. As a result, it is possible to repeat the switching state in which the FETs 1, 2 are alternately turned on and off and the rest state in which the FETs 1, 2 are maintained in a disconnected state.

Figure 12:
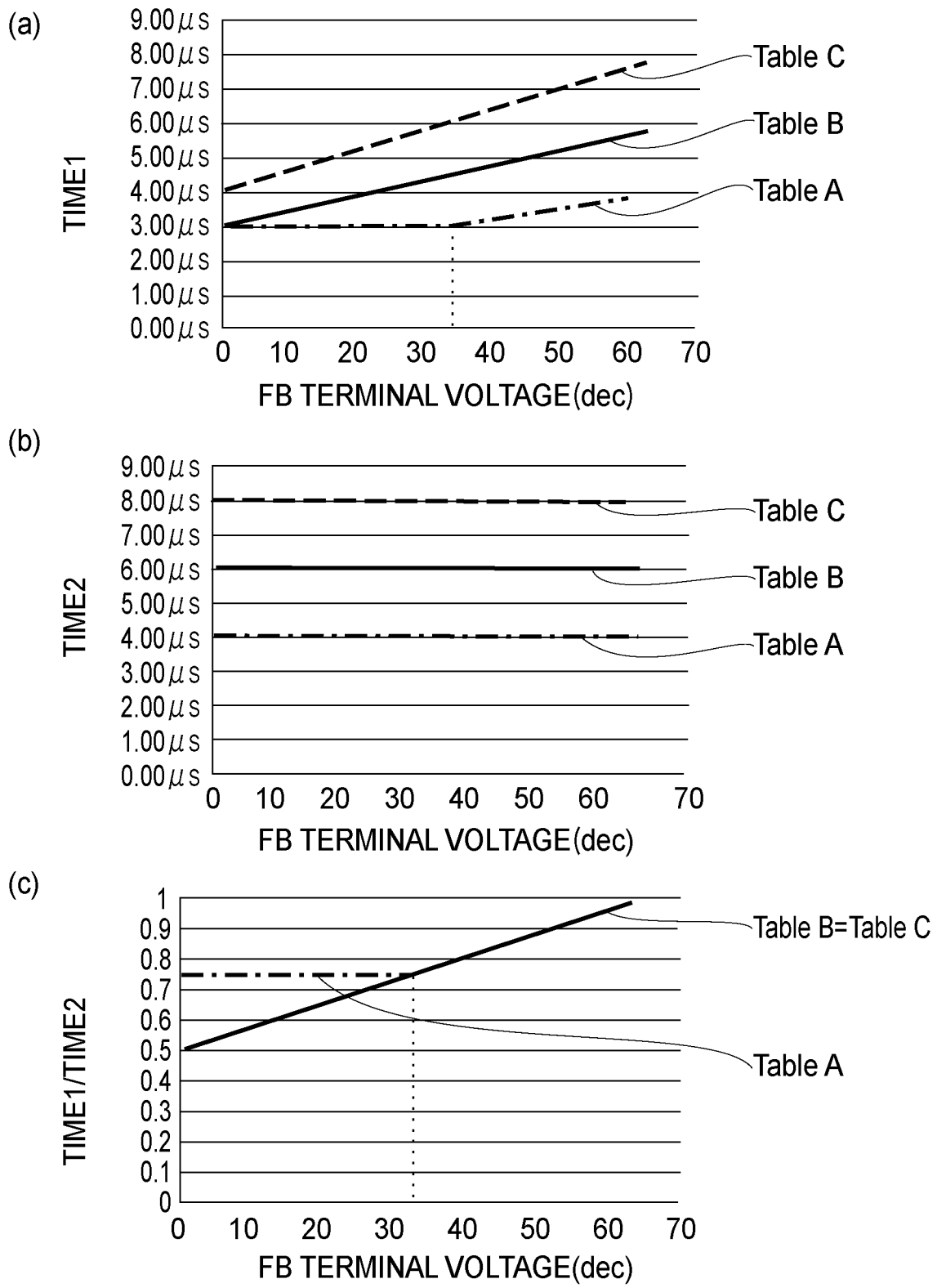
In FIG. 12, (a) to (c) are graphs each showing a correspondence between the FB terminal voltage and an associated on-time of the switch in Embodiment 3.

In FIG. 12, (a) to (c) are graphs showing the contents of the respective tables shown in FIG. 11. In FIG. 12, (a) is a graph showing a relationship between the FB terminal voltage and the time TIME1 in each table of FIG. 11, (b) is a graph showing a relationship between the feed-back terminal voltage and the time TIME2 in each table of FIG. 11, and (c) is a graph showing a relationship between the feed-back terminal voltage and the time ratio (TIME1/TIME2) in each table of FIG. 11. In (a) to (c) of FIG. 6, the table A (Table A) is indicated by a chain line, the table B (Table B) is indicated by a solid line, and the table C (Table C) is indicated by a broken line. In the graphs shown in FIG. 12, data are the same as those in the graphs shown in FIG. 6 in Embodiment 1 except for those in a period in which the above-described switching power source circuit 100 is in the intermittent operation state. As regards the table A (Table A) when the FB terminal voltages are 1 to 33 at which the switching power source circuit 100 is in the intermittent operation state, a difference from Embodiment 1 is that the time TIME1 is fixed at 3 μs ((a) of FIG. 12 and that the time ratio (TIME1/TIME2) is fixed at 0.75.

As described above, in this embodiment, control of changing the switching frequencies of the FET1 and the FET2 and putting the switching power source circuit 100 in the intermittent operation state depending on the average current value of the current flowing through the FET1 is effected, and, the control is changed by the target voltage of the output voltage Vout. As a result, it is possible to realize the switching power source capable of flexibly meeting required specifications for each of the target voltages while achieving the zero voltage switching even in any load with an expensive constitution. Incidentally, in the above-described Embodiments 1 to 3, the type of using the average current flowing through the FET1 was described, but the average current value is an example. For example, a type of effecting the control by using an integrated value of the current flowing through the FET1 and a threshold corresponding to the integrated value may also be employed.

As described above, according to this embodiment, with a simple constitution, the zero voltage switching can be carried out efficiently.

[Embodiment 4]

The power source devices described in Embodiments 1 to 3 are applicable to a low-voltage source of the image forming apparatus, i.e., a power source for supplying electric power to a driving portion such as a controller or a motor. In the following, a constitution of an image forming apparatus to which the power source devices of Embodiments 1 to 3 are applicable.

[Image Forming Apparatus]

Figure 13:
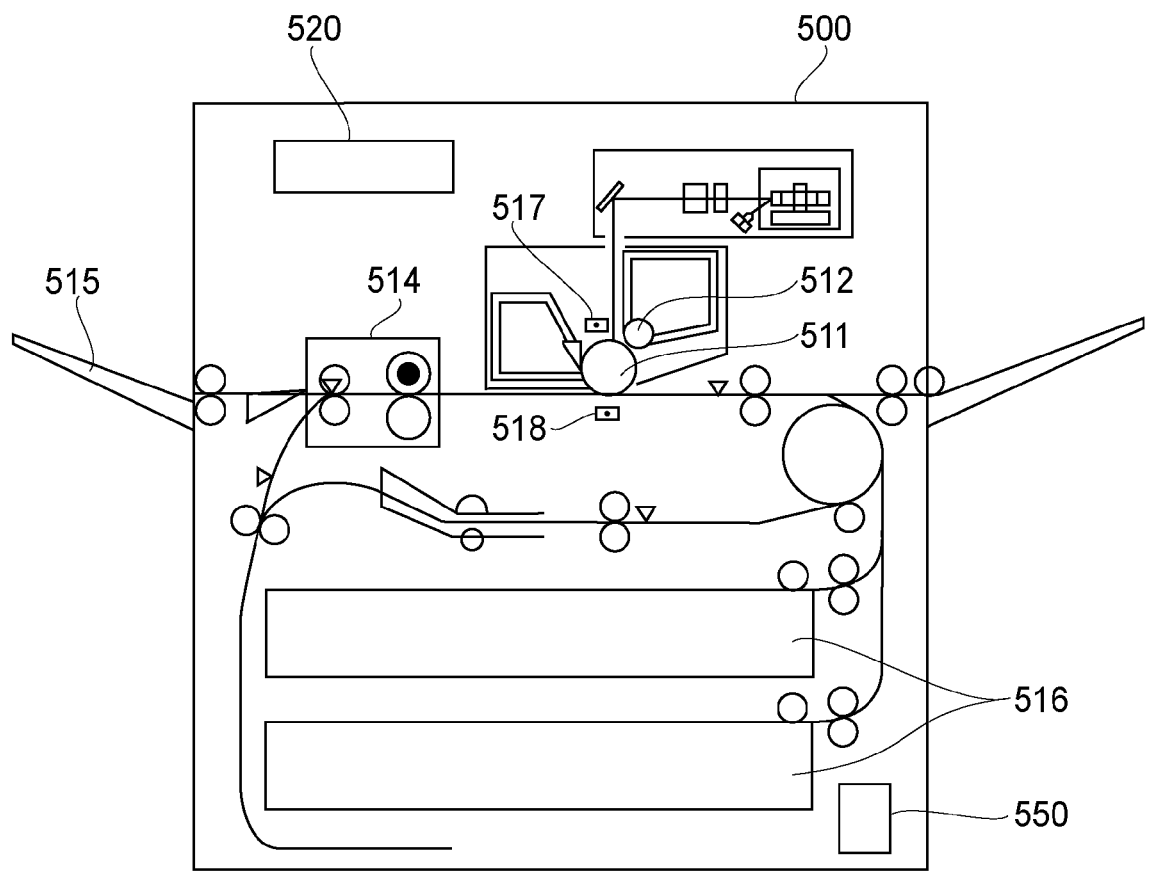
FIG. 13 is a schematic sectional view of a laser beam printer in Embodiment 4.

As an example of the image forming apparatus, a laser beam printer will be described. FIG. 13 illustrates a schematic structure of the laser beam printer which is an example of an electrophotographic printer. A laser beam printer 500 includes a photosensitive drum 511 as an image bearing member for forming an electrostatic latent image, a charging portion (charging means) 517 for electrically charging the photosensitive drum 511 uniformly, and a developing portion (developing means) 512 for developing, with a toner, the electrostatic latent image formed on the photosensitive drum 511. The toner image formed on the photosensitive drum 511 is transferred by a transfer portion (transfer means) 518 onto a sheet (not shown) as a recording material supplied from a cassette 516, and then the toner image transferred on the sheet is fixed by a fixing device 514 and thereafter the sheet is discharged onto a tray 515. The photosensitive drum 511, the charging portion 517, the developing portion 512 and the transfer portion 518 constitute an image forming portion. Further, the laser beam printer 300 includes a power source device 550 as described in Embodiments 1 to 3. The image forming apparatus to which the power source device 550 in Embodiments 1 to 3 applicable is not limited to the image forming apparatus shown in FIG. 13, but may also be an image forming apparatus including a plurality of image forming portions, for example. The image forming apparatus may also be an image forming apparatus including a primary transfer portion where the toner image is transferred from the photosensitive drum 511 onto an intermediary transfer belt and a secondary transfer portion where the toner image is transferred from the intermediary transfer belt onto the sheet.

The laser beam printer 500 includes a controller 520 for controlling an image forming operation by the image forming portion and a sheet feeding operation, and the power source device 550 corresponds to the power source device including the switching power source circuit 100 in Embodiments 1 to 3. The power source device 550 supplies the electric power as the output voltage (e.g., 24 V) to a motor or the like for rotating the photosensitive drum 511 or, for driving various rollers for feeding the sheet. Further, the power source device 550 supplies the electric power of 5 V or the like to the controller 520. Further, depending on the operation state of the image forming apparatus, the controller 520 outputs a signal, indicating the operation state, to the power source device 550 during the image forming operation state (corresponding to the above-described ready state). This means that in Embodiments 1 to 3, the 24 VSL signal with the high (High) level is outputted to the above-described switching power source circuit 100. On the other hand, during the stand-by state (corresponding to the above-described sleep state) of the image forming apparatus, the controller 520 outputs a signal, indicating the operation state, to the power source device 550. This means that in Embodiments 1 to 3, the 24 VSL signal with the low (Low) level is outputted to the above-described switching power source circuit 100. As a result, depending on the operation state of the laser beam printer 500, switching of the target voltage of the output voltage Vout is carried out, and by the above-described control, the output voltage Vout is maintained at a predetermined voltage.

As described above, according to this embodiment, with a simple constitution, the zero voltage switching can be carried out with efficiency.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-247608 filed on Dec. 18, 2015, which is hereby incorporated by reference herein in its entirety.

What is claimed is:

1. A power source device comprising:
  a transformer including a primary winding and a secondary winding;
  a first switch portion connected with the primary winding in series;
  a circuit including a clamp capacitor and a second switch portion connected in series and connected with the primary winding in parallel;

a first detection portion that detects a current flowing through said first switch portion; and
a controller configured to:
control conduction between said first switch portion and said second switch portion so that said first switch portion and said second switch portion are alternately conducted to generate an output voltage at a secondary side of said transformer;
control conduction of said first switch portion and said second switch portion so that a value of the current detected by said first detecting portion does not exceed a threshold depending on conduction times of said first switch portion and second switch portion; and
calculate the threshold on the basis of a time in the ON state of said first switching portion and a time in the OFF state of said first switching portion.

2. The power source device according to claim 1, wherein said first detecting portion detects an average current value the current flowing through said first switch portion.

3. The power source device according to claim 2, further comprising;
a first capacitor connected with said first switch portion in parallel,
wherein the controller calculates the threshold on the basis of a current value of an exciting current of said transformer caused to flow for discharging electric charges charged in said first capacitor when said second switch portion is in the OFF state.

4. The power source device according to claim 3, wherein:
the current has a plurality of first thresholds and a plurality of second thresholds associated with the plurality of first thresholds,
each of the plurality of second thresholds is a smaller than an associated one of the first thresholds, and
when the average current value exceeds a second threshold, among the plurality of second thresholds, said controller makes the conduction times of said first switch portion and said second switch portion longer than when the average current value does not exceed the second threshold while maintaining a ratio between the conduction times of said first switch portion and said second switch portion.

5. The power source device according to claim 4, further comprising:
a comparing portion for comparing the output voltage at the signal side with a target voltage,
wherein on the basis of a comparison result of said comparing portion, said controller controls the conduction times of said first switch portion and said second switch portion.

6. The power source device according to claim 5, wherein on the basis of the comparison result of said comparing portion, said controller variably changes the conduction time of said first switch portion and sets the conduction time of said second switch portion at a predetermined time.

7. The power source device according to claim 5, wherein on the basis of the comparison result of said comparing portion, said controller variably changes the conduction times of said first switch portion and said second switch portion.

8. The power source device according to claim 6, further comprising:
a second detecting portion that detects an input voltage in a primary side of said transformer,
wherein when said second detecting portion detects a fluctuation of the input voltage, said controller controls the conduction time of said first switch portion on the basis of a ratio inversely proportional to a ratio of the fluctuation of the input voltage.

9. The power source device according to claim 5, wherein when the average current value exceeds a largest first threshold of the plurality of first thresholds, said controller disconnects said first switch portion and said second switch portion.

10. The power source device according to claim 5, wherein:
the target voltage includes a first target voltage and a second target voltage that is lower than the first target voltage,
said power source device further comprises a switching portion for switching the output voltage at the secondary side to the first target voltage or the second target voltage, and
said controller controls the conduction times of said first switch portion and said second switch portion depending on the first or second target voltage switched by said switching portion.

11. The power source device according to claim 10, wherein:
the first threshold and the second threshold are provided correspondingly to the first target voltage and the second target voltage, respectively, and
a difference between the first threshold and the second threshold corresponding to the first threshold at the first target voltage is larger than a difference between the first threshold and the second threshold corresponding to the first threshold at the second target voltage.

12. The power source device according to claim 5, wherein:
said power source device is operable in an intermittent operation state where a switching state where said first switch portion and said second switch portion alternately connect and disconnect and a rest state where said first switch portion and said second switch portion are held in a disconnected state are repeated and is operable in a continuous operation state where said first switch portion and said second switch portion alternately connect and disconnect continuously, and
on the basis of the average current value detected by said detecting portion, said controller control said first switch portion and said second switch portion so that said power source device is in the intermittent operation state or the continuous operation state.

13. The power source device according to claim 12, wherein, in a case where the output voltage at the secondary side is the first target voltage, said controller controls said first switch portion and said second switch portion so that the power source device is in the intermittent operation state when the average current value detected by said detecting portion is below a smallest second threshold of the plurality of second thresholds.

14. The power source device according to claim 12, wherein, in a case where the output voltage at the secondary side is the second target voltage, said controller controls said first switch portion and said second switch portion so that the power source device is in the intermittent operation state when the average current value detected by said detecting portion is below a predetermined second threshold of the plurality of second thresholds.

15. The power source device according to claim 13, wherein when the comparison result of said comparing portion is larger than a predetermined value, said controller controls said first switch portion and said second switch portion so that said power source device is in the continuous operation state.

16. An image forming apparatus comprising:
an image forming portion that forms an image; and
a power source device that supplies electric power to said image forming apparatus,
wherein said power source device includes:
  a transformer including a primary winding and a secondary winding;
  a first switch portion connected with the primary winding in series;
  a circuit including a clamp capacitor and a second switch portion connected in series and connected with the primary winding in parallel;
  a detecting portion that detects a current flowing through said first switch portion; and
  a first controller configured to:
    control conduction between said first switch portion and said second switch portion so that said first switch portion and said second switch portion are alternately conducted to generate an output voltage at a secondary side of said transformer;
    control conduction of said first switch portion and said second switch portion so that a value of the current detected by said detecting portion does not exceed a threshold depending on conduction times of said first switch portion and second switch portion; and
    calculate the threshold on the basis of a time in the ON state of said first switching portion and a time in the OFF state of said first switching portion.

17. The image forming apparatus according to claim 16, further comprising:
a second controller configured to control said image forming apparatus,
wherein on the basis of a state of a load of said image forming apparatus, said second controller outputs a signal instructing said switching portion to switch to a first target voltage or a second target voltage.

18. The image forming apparatus according to claim 17, wherein said detecting portion detects an average current value the current flowing through said first switch portion.

19. The image forming apparatus according to claim 18, further comprising:
a first capacitor connected with said first switch portion in parallel,
wherein the first controller calculates the threshold on the basis of a current value of an exciting current of said transformer caused to flow for discharging electric charges charged in said second capacitor when said second switch portion is in the OFF state.

* * * * *